United States Patent
Kumar et al.

(10) Patent No.: US 12,242,515 B2
(45) Date of Patent: Mar. 4, 2025

(54) SYSTEM AND METHOD FOR CUSTOM LABEL EMBEDDING

(71) Applicant: User Testing, Inc., San Francisco, CA (US)

(72) Inventors: Ranjitha Kumar, Champaign, IL (US); Kristijan Ivancic, Glasgow (GB); Kelsey Elizabeth Turbeville, San Francisco, CA (US); Ali Hur Zaidi, Saratoga, CA (US); Jenny Gutierrez Villalobos, Falls Church, VA (US); Jason Matthew Moss, Decatur, GA (US)

(73) Assignee: USER TESTING, INC., San Francisco, CA (US)

( * ) Notice: Subject to any disclaimer, the term of this patent is extended or adjusted under 35 U.S.C. 154(b) by 0 days.

(21) Appl. No.: 18/300,032

(22) Filed: Apr. 13, 2023

(65) Prior Publication Data
US 2024/0346047 A1    Oct. 17, 2024

(51) Int. Cl.
*G06F 16/00* (2019.01)
*G06F 16/22* (2019.01)
*G06F 16/28* (2019.01)

(52) U.S. Cl.
CPC ........ *G06F 16/285* (2019.01); *G06F 16/2237* (2019.01)

(58) Field of Classification Search
CPC .................... G06F 16/285; G06F 16/2237
See application file for complete search history.

(56) References Cited

U.S. PATENT DOCUMENTS

| | | | | |
|---|---|---|---|---|
| 10,503,738 B2* | 12/2019 | Jhamtani | ................ | G06F 40/30 |
| 10,754,318 B2* | 8/2020 | Nagarajan | ................ | B25J 9/161 |
| 10,936,662 B1* | 3/2021 | Parshall | ............ | G06F 16/9032 |
| 11,488,028 B2* | 11/2022 | Soni | ....................... | G06N 20/00 |
| 11,500,939 B2* | 11/2022 | Aggarwal | ............ | G06V 10/426 |
| 2010/0114654 A1* | 5/2010 | Lukose | .................. | G06Q 30/00 |
| | | | | 705/14.54 |
| 2023/0099888 A1* | 3/2023 | Jaini | ....................... | G06N 3/04 |
| | | | | 455/466 |
| 2023/0101174 A1* | 3/2023 | Kopru | ................... | G06N 3/045 |
| | | | | 705/26.64 |
| 2023/0196032 A1* | 6/2023 | Gangireddy | ........ | G06F 16/3329 |
| | | | | 704/3 |

* cited by examiner

*Primary Examiner* — Debbie M Le
(74) *Attorney, Agent, or Firm* — MLO, a professional corp.

(57) ABSTRACT

A computer-based method to identify test user intent during evaluation of user interaction with a digital asset is provided comprising: receiving test user interaction data; producing a vector based upon the received data; using a machine learning model to project the vector to a first non-custom label embedding vector space; using the machine learning model to project the vector to a second custom label embedding vector space; determining a starting label associated with the vector based at least in part upon a nearest neighbor search within the first embedding vector space for a label nearest to the vector and a nearest neighbor search within the second embedding vector space for a nearest neighbor to the vector, receiving identification of a custom label; and adjusting the second embedding vector space based upon the custom label.

61 Claims, 28 Drawing Sheets

WHAT THE API GETS

```
{
"ELEMENT_TEXT": "SEARCH THIS WEBSITE",
"PREDICTED_TAG": "FIND A SERVICE",
"ORIGINAL_PREDICTED_TAG": "SEARCH",
"ACCOUNT_UUID": F53FAA3D-8A06-4741-AF89-3BC5A12B37E1",
"FEEDBACK": "TOO_GENERAL"
}
```

WHAT THE USER SEES

SEARCH → FIND A SERVICE

212

{
"ELEMENT_TEXT": "SEARCH THIS WEBSITE",
"ACCOUNT_UUID": "F53FAA3D-8A06-4741-AF89-3BC5A12B37E1"
} ← 216

218 →
[
{
"TEXT": "FIND A SERVICE",
"SCORE": 0.9227465
},
{
"TEXT": "FIND MORE SERVICES",
"SCORE": 0.6637002
},
{
"TEXT": "SERVICE DETAILS",
"SCORE": 0.584207
},
{
"TEXT": "BROWSE CATEGORY",
"SCORE": 0.4347937
},
{
"TEXT": "SEARCH",
"SCORE": 0.4347894
}
]

Table 1

1806 — Pain Point
1806 — Confusion
1808 — Change to: "Visual appeal"
1806 — Suggestion
1806 — Dislike
1806 — Aversion 1802
1804

Table 2

FIG. 18A

1808 — Change to: "Visual appeal"
1806 — Suggestion

...ns
...wim, find information
...e New York city
...tens you now to register.

I wish it was presented in a way that was a little bit more appeasing to the eyes because immediately i got discouraged because of all this reading 1802
1804

FIG. 18B

SYSTEM AND METHOD FOR CUSTOM LABEL EMBEDDING

BACKGROUND

Computer-based behavioral analytics tools have been used to record and monitor users' interactions with a digital asset. These tools often are used to capture and record user and system-level events indicative of user interactions that occur on deployed websites and applications. The user interactions often are referred to as a user's digital experiences. Recordings of a user's digital interactions with a digital asset can play an important role in digital experience management. A digital asset can be analyzed based upon recordings of users' digital experiences to evaluate its effectiveness in operation in terms of ease of use, user engagement, or delivery of services. Recorded information can include quantitative information such as aggregation of data captured during each action a user performs during digital interaction with a digital asset. Recorded information also can include qualitative information such as recordings of a user's interaction experiences, including images presented to a user and a user's recorded verbal commentary.

Computer-generated visual representations of user interactions with a digital asset can be produced based upon a variety of captured usage information that can include user-level actions and system-level events. Usage information often must be manually labeled with words that express a humanly intelligible interpretation of user intent associated with test user interaction with a digital asset. Labeling usage information allows companies and organizations to measure performance metrics such as conversion rates (e.g., clicks to sales) and drop-off rates (e.g., leaving a website) across key user interaction flows. Setting up event labeling often involves instrumenting a digital asset's code to map events such as button clicks to semantic descriptions, also known as intents (e.g., search, checkout, register). Although modern analytics tools often offer graphical user interfaces to instrument the code, instrumenting code often still involves manual processes that can be time-consuming. Recent research approaches have demonstrated how machine learning (ML) models can be trained to automatically label user interaction data. These ML models generally have been used to predict user intents that occur frequently in digital experiences. Different groups or organizations may use different vocabularies to describe user intent during interaction with a digital asset. However, existing ML models typically use fixed vocabularies that cannot be easily augmented or customized for different groups or organizations Unfortunately, fixed vocabularies often may not be well suited to precisely express different users' different intents across a range of different groups such as, organizations, industries, ecommerce domains, fields of interest, or online groups, each of which may have its own specialized vocabulary to express user intent associated with user interactions with a digital asset. For example, a set of generic user interactions with a digital asset by users who are members of one group may be associated with different user intent than would be the same or similar generic user interactions with a different digital asset by users who are members of a different group. The two groups may use different word vocabularies to express different intents to associate with the same or similar generic digital user interactions. Academic research in the field of 'folksonomy' has documented the importance and prevalence of shared language, especially among distributed, online groups. See, Jackson, C., Crowston, K., Østerlund, C. et al. Folksonomies to Support Coordination and Coordination of Folksonomies. Computer Supported Coop Work (CCSW) 27, 647-678 (2018). Shared language domains can be key to group collaboration and can be culturally and situationally specific. Some organizations use highly technical language unfamiliar to outsiders but efficient for their individual group, while other groups may use the same language quite differently. For example, an online fabric store's use of the word "needle" compared to the website for the Seattle Space Needle. Moreover, for example, words like "king" and "queen" can be closely associated with "product", "bed", or "buy" for a bedding and mattress company, but remain associated with "royalty", "coronation", and "palace" for a news organization that reports on the British Monarchy.

Computer-based behavior analytics tools have been used to harvest words from a language domain—the words specific to a particular community or group—from user inputs. Computer-based behavior analytics tools have been used to make associations between user interactions with digital assets and corresponding user intent according to language domain-specific meaning. However, there is a need for a computer-based behavior analytics tool that can be more easily adapted to different language domains to associate language domain-specific labels to indicate intent to associate with users' digital asset interactions.

SUMMARY

In one aspect, a computer-based methods provided to identify test user intent during evaluation of user interaction with a digital asset. Data indicative of test user interaction with the digital asset is received and a vector is produced that represents the received data. A trained machine learning model is used to project the vector to a first non-custom label embedding vector space. The trained machine learning model is used to project the vector to a second custom label embedding vector space. A starting label is determined that is associated with the vector based at least in part upon a nearest neighbor search within the first embedding vector space for a label nearest to the vector and a nearest neighbor search within the second embedding vector space for a nearest neighbor to the vector. User input is received to associate a custom label with the starting label. The second embedding space is adjusted based upon the user input.

In another aspect, a system is provided that includes processor circuitry and memory storing instructions which, upon execution by the one or more processor circuits, causes the system to perform a method. The method includes multiple operations that include receiving data indicative of test user interaction with the digital asset and producing a vector that represents the received data. The operations include using a trained machine learning model to project the vector to a first non-custom label embedding vector space and using the trained machine learning model to project the vector to a second custom label embedding vector space. The operations include determining a starting label associated with the vector based at least in part upon a nearest neighbor search within the first embedding vector space for a label nearest to the vector and a nearest neighbor search within the second embedding vector space for a nearest neighbor to the vector. The operations include receiving user input to associate a custom label with the starting label and adjusting the second embedding vector space based upon the user input.

In yet another aspect, a system includes a storage memory database including a plurality of different respective storage memory regions corresponding to a plurality of different respective groups, wherein different respective storage memory regions store respective copies of a global embedding vector space and store different respective custom embedding vector spaces associated with different respective groups. The system includes processor circuitry and memory storing instructions which, when executed by the processing circuitry, cause the processing circuitry to perform a method including multiple operations. Data are received that identifies a group and that provides information indicative of test user interaction with a digital asset associated with the identified group. A vector is produced that represents the received data. A trained machine learning model is used to project the vector to an instance of a global label embedding vector space and to project the vector to a custom label embedding vector space associated with the identified group. A starting label is determined that is associated with the vector based at least in part upon a nearest neighbor search within the instance of the global embedding vector space for a label nearest to the vector and a nearest neighbor search within the custom embedding vector space associated with the identified group for a nearest neighbor to the vector. User input is received associating a custom label with the determined starting label. The custom embedding vector space associated with the identified group is adjusted based upon the received user input.

DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2B is an illustrative drawing showing example information presented to a user at an update UI and corresponding example information presented to the vector operations API.

FIG. 18A is an illustrative drawing of a display screen showing an audio transcript and associated with example starting labels and an example custom label.

FIG. 18B is an illustrative drawing of an enlarged view of a portion of the transcript of FIG. 18A showing an example starting label and the example custom label.

DETAILED DESCRIPTION

Overview

The inventors have developed a computer-implemented system to create and modify embedding vector spaces associated with a trained machine learning model to associate users' digital asset interactions with labels indicating user intent, based upon group language domain-specific semantics. As used herein, the term 'digital asset' refers to a user interface that includes interactive elements. The interactive elements can include visual elements, audio elements, haptic elements, or other sensory elements, for example. A digital asset can include executable code used to configure a computing machine to render the digital asset user interface on an electronic display screen. The code can include render elements, such as DOM (document object model) tree data used to render user interactive display elements. As used herein the term 'language domain' refers to a set of shared lexical semantics, which can be manifested as a shared understanding of words, phrases and sentences within a prescribed group, such as a company, organization, industry group, ecommerce domain, online group, field of interest, a trade group, a professional group, or family, for example. As used herein, the term 'digital ontology' refers to a set of words, phrases, icons, screens, sequence of screens, actions, sequence of actions and/or combinations thereof associated with user interaction with a digital asset such as a website or an app.

An example embodiment can embed digital ontology data captured during user interaction with a digital asset in a vector that indicates relations between the data. The example embodiment can use a trained machine learning model to project the vector to a vector embedding space to predict a word-based label to associate with the user interaction. Group-specific feedback can be received to adjust a custom vector embedding space associated with a specific group to associate a different label with the user interaction according to words from a specific language domain used by the specific group. Different groups can use different group-specific feedback to adjust different group-specific custom embedding vector spaces to associate labels with users' digital asset interactions according to words from different specific language domains used by the different groups. Thus, group-specific labels can be more easily produced based upon different group's different language domains.

Figure 1A:
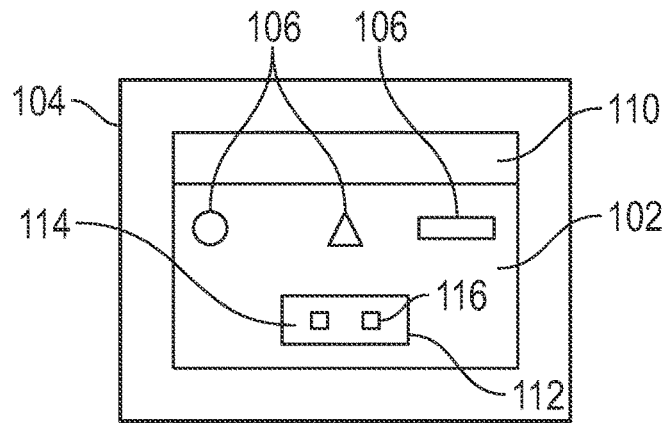
FIG. 1A is an illustrative drawing representing a digital asset operative on a computing device.

FIG. 1A is an illustrative drawing representing an example digital asset 102 operative on an example computing device 104. An example digital asset 102 can include one or more interactive elements 106. An example digital asset 102 can be displayed as one or more web pages or a mobile application, for example. An example computing device 104 may be a desktop computer, a vehicle computer, a tablet computer, a navigational device, a portable media device, a smart phone, or a wearable device (e.g., a smart watch, smart glasses, smart clothing) or other computing machine operated by the test user. The example computing device 104 may include a browser 110 to display content pages that may be downloaded in response to test user interaction with one or more interactive elements 106. The interactive elements 106 can include interactive visual elements that include icons indicative of functions that can be performed, such as a button, a switch, a slider bar, a pull-down menu, or a text entry field. A browser recorder extension 114 can be provided to capture user interaction elements and user experience elements such as screen images, screen recordings and audio, such as a user's voice, events and render structures at the one or more user computing devices 104. URLs displayed on screen images also can be captured. An example browser recorder extension 112 includes a content script 114 to configure a computing device 104 to record events such as clicks and page loads, for example. An example browser recorder extension 112 also includes a background script 116 to configure a computing device 104 to handle recording of screen images, for example. Alternatively, an app can be downloaded to capture the interaction element and user experience elements.

Figure 1B:
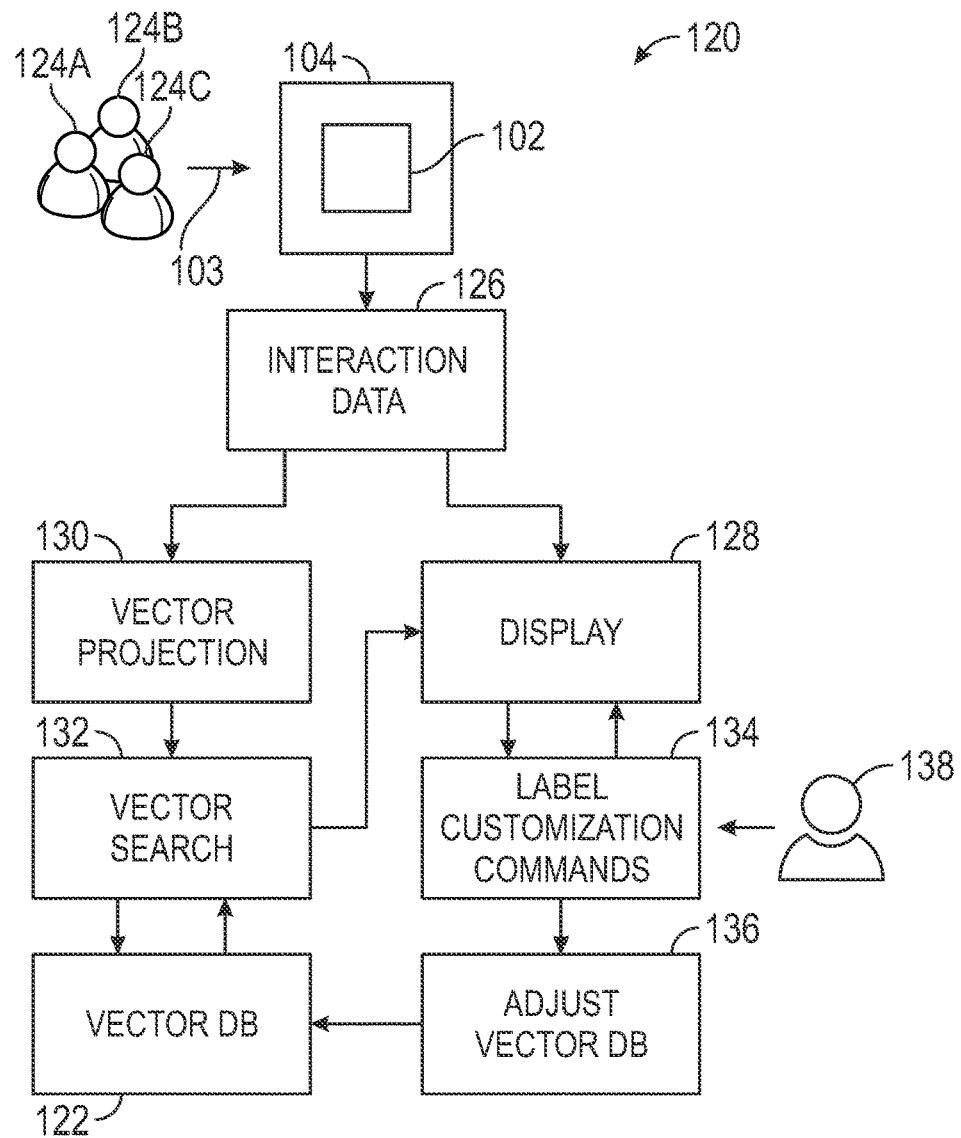
FIG. 1B is an illustrative flow diagram showing an example process using a customizable embedding vector space to represent test user interaction with a digital asset.

FIG. 1B is an illustrative flow diagram showing an example process 120 using a customizable embedding vector space 122 to represent test user interaction with a digital asset. The customizable vector space 122 can be used to provide labels to associate with an electronic screen display representation of one or more first (test) users' digital asset interactions and to receive input from a second (analyst/administrator) user to modify associations between labels and test user interactions provided by the custom embedding space 122, based upon a custom language domain. The example method 120 includes multiple operations 126-136. An example computing machine 1900 shown in FIG. 19 can be specially configured according to computer executable code to implement operations 126-136. In an example process 120, first users include test users and a second user can include one or more analyst/administrator users.

The process 120 can be used to analyze interactions of one or more test users 124A, 124B, 124C who interact with interactive elements 106 of a digital asset 102 operative on one or more computing device 104 (only one shown). Test user interaction sessions may be 'directed' or 'undirected'. A directed user interaction session typically requires test users to attempt an identical or a similar set of tasks in an identical or a similar order. During a directed version of the user interaction session for example, the test user interaction component 102 may present users 124A, 124B or 124C with access to the digital asset 102 and also with a series of tasks to accomplish using the digital asset 102.

In an example directed test user scenario, test users 124A, 124B, 124C may be assigned a set of tasks to complete using the example digital asset 102. For example, the test users may be asked to use the digital asset 102 to go to a website that offers a wide variety of items for sale, select an item, place an order for the item, and pay for the item. Completing the tasks may involve multiple interactions 103 with example interaction elements 106. Different test users may interact with different sequences of interaction elements 106 in completing the tasks. During an example first test user session, an example first test user 124A may enter a URL in a browser search field to navigate to the website, which counts as one interaction in this example. Once the website loads, the first test user 124A may select (e.g., click on) an interaction element represented as a category button icon to select a category of items, which counts as one interaction in this example. Next, the first test user 124A may enter a first search term into a website search field and select (e.g., click on) a search button icon to search for a specific first item on the website; entry of the search term and selecting the search button is one interaction in this example. Next, the first test user 124A may scroll through information on the website about the first item; scrolling counts as one interaction in this example. Next, the first test user 124A may place an order for the first item by selecting (e.g., clicking on) an order button icon, which counts as one interaction in this example. Next, the first user 124A may enter a second search term into a website search field and select the search button icon to search for a specific second item; entry of the search term and selecting the search button counts as one interaction in this example. Next, the first test user 124A may select a scroll control icon to scroll through information about the second item; scrolling counts as one interaction in this example. Next, the first test user 124A may place an order for the second item by selecting (e.g., clicking on) an order button icon, which is one interaction in this example. Next the first test user 124A may delete the order for the first item by selecting (e.g., clicking on) a delete button icon. Next, the first test user 124A may pay for the second item by selecting a pay button icon. In an example second test user session, a second test user 124B may complete the requested tasks by selecting only the second item, ordering only the second item, and paying for the only the second item, without scrolling for information about the second item and without selecting, ordering, and canceling an order for the first item. Thus, in this illustrative test scenario, the first and second test users 124A, 124B interact with different combinations of interaction elements. Additional test users may complete the requested tasks using other sequences of interactions with other combinations of interaction elements.

An interaction data capture operation 126, captures user interaction data indicative of a test users' digital asset interactions with a digital asset. The one or more computing devices 104 can be configured to receive test user input 106 and to capture user interaction information produced during user interactions 103 by multiple test users 124A, 124B, 124C with a digital asset 102. As explained above, the one or more computing devices 104 can be configured to include a browser recorder extension 112 that includes a content script 114 and a background script 116 to capture data indicative or test user interaction with a digital asset 102. The interaction data capture operation 126 operates contemporaneously with the one or more test users' interactions 103 with a digital asset 102. Data indicative of the test user's interactions 103 with the one or more visual elements are captured and saved in an electronic memory device (not shown). More specifically, feature information associated with interaction elements with which one or more test users 124A, 124B, 124C interacts can be captured and saved in a storage memory device. Example feature information, referred to herein as "features", can include one or more of visual features, textual features, or metadata features. Visual features can include raw pixels of a visual element. For example, visual features can include the pixels illuminated to display an icon on the display screen. Textual features can include element text, placeholders, for example. Textual features can include text displayed on the display screen located upon or adjacent to an associated icon. For example, a button can be labeled to indicate its function, or a text entry field can be labeled to indicate the kind of information to be entered. Metadata features can include class, position, dimensions, for example. In other words, metadata features can include information such as location, size, and type of an icon.

Display operation 128 generates a visual representation on a computer display screen (not shown) of test user interactions with the digital asset 102 by example test users 124A, 124B, 124C. An example operation 128 generates and displays a Sankey diagram (not shown) representation of test user interaction based upon the user interaction data captured at operation 126. Use of Sankey diagrams to represent user interactions with digital assets is well known to persons of ordinary skill in the art and will not be explained further. For example, U.S. Pat. No. 11,502,923, entitled, Analytic Interactive Visualization System and Method, which is expressly incorporated herein in its entirety by this reference, discloses an example generation and use of a Sankey diagram to represent test user interaction with a digital asset.

Vector projection operation 130 uses a machine learning trained model (not shown), which is described more fully below, to project an embedding vector into the embedding vector space 122. An example embedding vector represents user interaction features captured during operation 126 that correspond to a test user's interactions 103 with a digital asset 122. The embedding vector space 122 can be stored in a database. The embedding vector space 122 may be referred to herein abbreviated as the "embedding". An example embedding 122 can be organized to associate intent labels that represent inferred test user intent with the embedding vectors representing test user interactions with a digital asset's interaction elements.

Vector search operation 132 uses a nearest neighbor search to determine a label to associate with a vector projected during operation 130, to indicate a predicted user intent to associate with user interactions with a digital asset 102. More particularly, the embedding 122 includes a plurality of labels, each associated with a unique vector-based location within the embedding. Similarly, a vector generated during vector projection operation 130 indicates a vector-based location within the embedding. A nearest neighbor search is used to determine a label that is a nearest neighbor to the generated vector within the embedding 122. A label determined based upon the search is provided to the display operation 128 for display in association with a corresponding visual representation of the user interaction for which the label provides an indication of user intent Label customization request operation 134 can receive a user request to adjust one or more predicted labels displayed in the interaction representation displayed at display operation 128 to bring them into conformity with a prescribed language domain. As explained above, the display operation 128 provides a visual representation of test user interactions 103, based upon user interaction data captured at operation 126. More particularly, the search operation 132 can associate a label with user interactions shown within the representation, based upon a nearest neighbor search involving a vector generated using the vector projection operation 130 and labels within the embedding 122. An example label customization request operation 134 provides a computer user interface (explained below as update UI 204) in which the second user 138 can request a change of a label currently associated by the display operation 128 with a user interaction. For example, the second user 138 can request a change to a currently displayed label by changing one or more symbols, letters, words, phrases, or sentences of a current label or by substituting an entirely different label for the current label. The second user 138 can provide feedback input to control the label customization request operation 134 to indicate a prescribed language domain-specific label that more accurately expresses test user intent associated with a digital asset interaction indicated by the display operation 128, in accordance with a prescribed language domain.

A vector database update operation 136 adjusts a label within the embedding 122 based upon input received from the second user 138 at the label customization request operation 134. An example operation 136 can create and embed a new label in the embedding 122 in response to a customization request. An example vector database update operation 136 can adjust a vector location of an existing label within the embedding 122 in response to a customization request. Once the embedding 122 is adjusted, future nearest neighbor searches can arrive at label determinations that are more consistent with a prescribed language domain, based upon input received at operation 134. Moreover, changing the embedding 122 ensures that the label change is persistent.

User Input Directed Label Updating

Figure 2A:
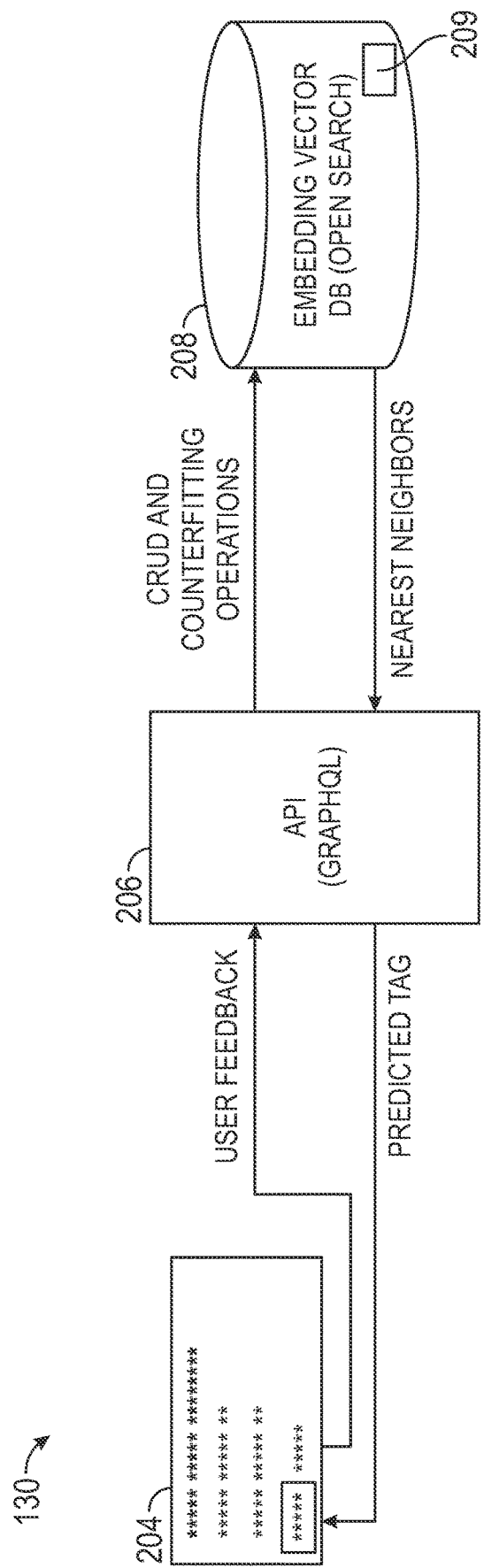
FIG. 2A is an illustrative functional block diagram showing an example embedding update system architecture.

FIG. 2A is an illustrative functional block diagram showing an example embedding update system architecture 200, in accordance with some embodiments. The example computing machine 1900 shown in FIG. 19 can be specially configured according to computer executable code to implement the embedding update system architecture 200. The example system architecture 200 includes an interactive update UI 204, a vector operations API (application programming interface) 206, and an embedding vector database control 208 that can perform vector operations to adjust an embedding vector space 209. An example update UI 204 can be implemented as a pop-up screen display and can receive analyst user feedback input to request adjustment and/or creation of an intent label association with an embedding vector within the embedding vector database control 208. A screen display that includes representations of test user interactions, explained above with reference to operation 128, may initially include a series of current 'generic' starting labels indicating test user intent. The displayed representations and labels can be viewed at the update UI 204. An analyst/admin user associated with a specific group that is associated with a group identifier, such as a universal unique identifier (UUID), and that uses language from a language domain specific to the group, can use an input device (e.g., a mouse device) to hover over a starter label, to associate the starter label with a custom label. More particularly, in an example embodiment, hovering over the starter label, triggers a display of a pop-up screen (not shown). Within an example pop-up screen, the analyst/admin user may choose to enter a custom label to edit the selected starter label. If the user does choose to edit the selected starter label, the user may enter a new custom label in a text-field box provided in the pop-up. The analyst/admin user can provide a custom label from the language domain of the group with which the analyst/admin user is associated. In response to user input providing a custom label, the display operation 128 causes the custom label to appear in a corresponding display representation of test user interaction with a digital asset 102. An example pop-up screen also can receive analyst/admin user input command indicating the manner in which to adjust an embedding 122. An example pop-up screen provides a dropdown menu that requests user selection between a feedback command indicating that the starter label is "incorrect" and a feedback command indicating that the starter label is "too general".

The vector operations API 206 determines vector operations to be performed to adjust the embedding 209 based upon analyst/admin user feedback input received at the update UI 204. The vector operations API 206 sends a corresponding request to perform the vector operations to the embedding vector database control 208. An example vector operations API 206 uses a query language to make requests for vector operations. More particularly, an example API implements the GraphQL language. Example requests that the vector operations vector operations API 206 can send to the embedding vector database control 208 an embedding vector and with a request to perform CRUD (Create, Read, Update, Delete) operations and/or requests to perform counterfitting (Attract or Repel) operations based upon the included embedding vector. The embedding vector space control 208 can use these vector operations to adjust the embedding 209 in response to an analyst/admin user request received at the update UI 204, as transformed into a query by the vector operations API 206. The embedding vector database control 208 can respond to a request provided via the vector operations API 206 by providing to the vector operations API 206 an updated custom nearest neighbor intent label, based upon the included embedding vector, using the adjusted embedding 209 as adjusted according to the analyst/admin user's request. The vector operations API 206 can return the updated custom nearest neighbor intent label to the update UI 204 for display. The returned nearest neighbor custom intent label also can be used to update intent labels associated with a current representation (e.g., a Sankey diagram) of test user interaction.

FIG. 2B is an illustrative drawing showing example information 212 presented to a user at an update UI 204 and corresponding example information 214 presented to the vector operations API 206, in accordance with some embodiments. Complex vector operations may occur embedding vector database control 208 as represented by information 214. However, the analyst/admin user is presented with a simplified information 212 indicating a label change. In this example, Account ID and TOO_GENERAL are bold, so the advantage is also the system being user-specific (Account ID) and behaving differently depending on why the analyst/admin user thinks the original label was wrong (e.g., "too general").

Figure 2C:
FIG. 2C is an illustrative drawing showing a vector search request and a corresponding nearest neighbor search results.

FIG. 2C is an illustrative drawing showing a vector search request 216 and corresponding nearest neighbor search results, in accordance with some embodiments. The vector search request 216 includes element text "search this website" and includes a unique identifier (UUID) that identifies a specific group associated with a specific custom embedding vector space stored at a specific storage memory region, explained more fully below. The search result information 218 includes multiple results prioritized based upon nearest neighbor scores. In some embodiments, an analyst/admin user can select a custom label from among the returned labels.

Figure 3A:
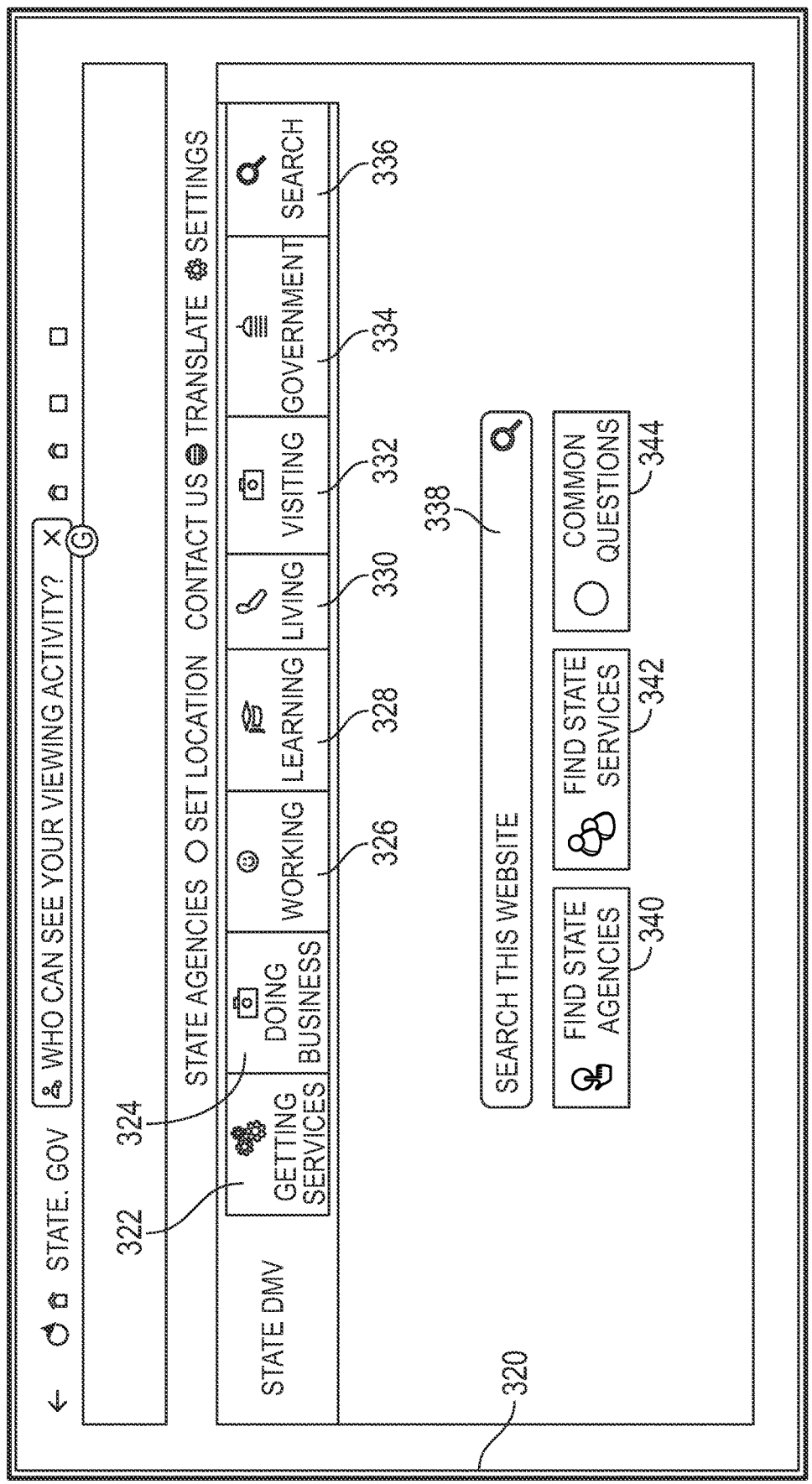
FIG. 3A is an example digital asset that includes a digital asset that includes a web page displayed on a computer screen display.

FIG. 3A is an example digital asset that is a first web page 320 that is an example interactive first web page owned by a State's Department of Motor Vehicles (DMV) that can be displayed on a computer screen display. The example first web page 320 can be used to navigate to different web pages that provide different DMV-related information. The example first web page 320 includes a first set of interactive elements, buttons 322-336, bearing text, "Getting Services", "Doing Business", "Working", "Learning", "Living", "Visiting", "Government", and "Search", respectively. The example first web page 320 includes an interactive element comprising a search field 338 containing the words, "Search this website", in which a search term can be entered. The example first web page 320 includes a second set of interactive elements, 340, 342, and 344 bearing text, "Find State Agencies", "Find State Services", and "Common Questions", respectively. Each button of the first set 322-334 corresponds to a different web page (not shown), and in response to a user selecting a button from the first set, the first web page 320 causes display of a different web page corresponding to the selected button. Similarly, each button of the first set 340-344 corresponds to a different web page (not shown), and in response to a user selecting a button from the second set, the first web page 320 causes display of a different web page corresponding to the selected button. The example web page 320 also is operative to return a different web page in response to a search request entered into the search field 338.

The State DMV website is an example group with a corresponding language domain that can be defined in terms of vocabulary used on the State DMV website. The example web page 320 is an example webpage from the State DMV website. The State DMV website language domain includes the following vocabulary: "Getting Services", "Doing Business", "Working", "Learning", "Living", "Visiting", "Government", "Search", "Find State Agencies", "Find State Services", "Common Questions" and "Search this website". The State DMV website has an ontology that is manifested in the button icons, the layout of the icons, and the transitions to different web pages in response to a user's different button selections, for example. Thus, the State DMV website associates certain words with certain user actions and to certain web page transitions. For example, a user action selecting the button bearing the text "Getting Services" can cause a transition from the example first web page 320 to a second web page (not shown) that indicates services provided by the State DMV. Similarly, a user action selecting the button bearing the text "Learning" can cause a transition from the example first web page 320 to a third web page (not shown) that indicates learning resources provided by the State DMV.

Figure 3B:
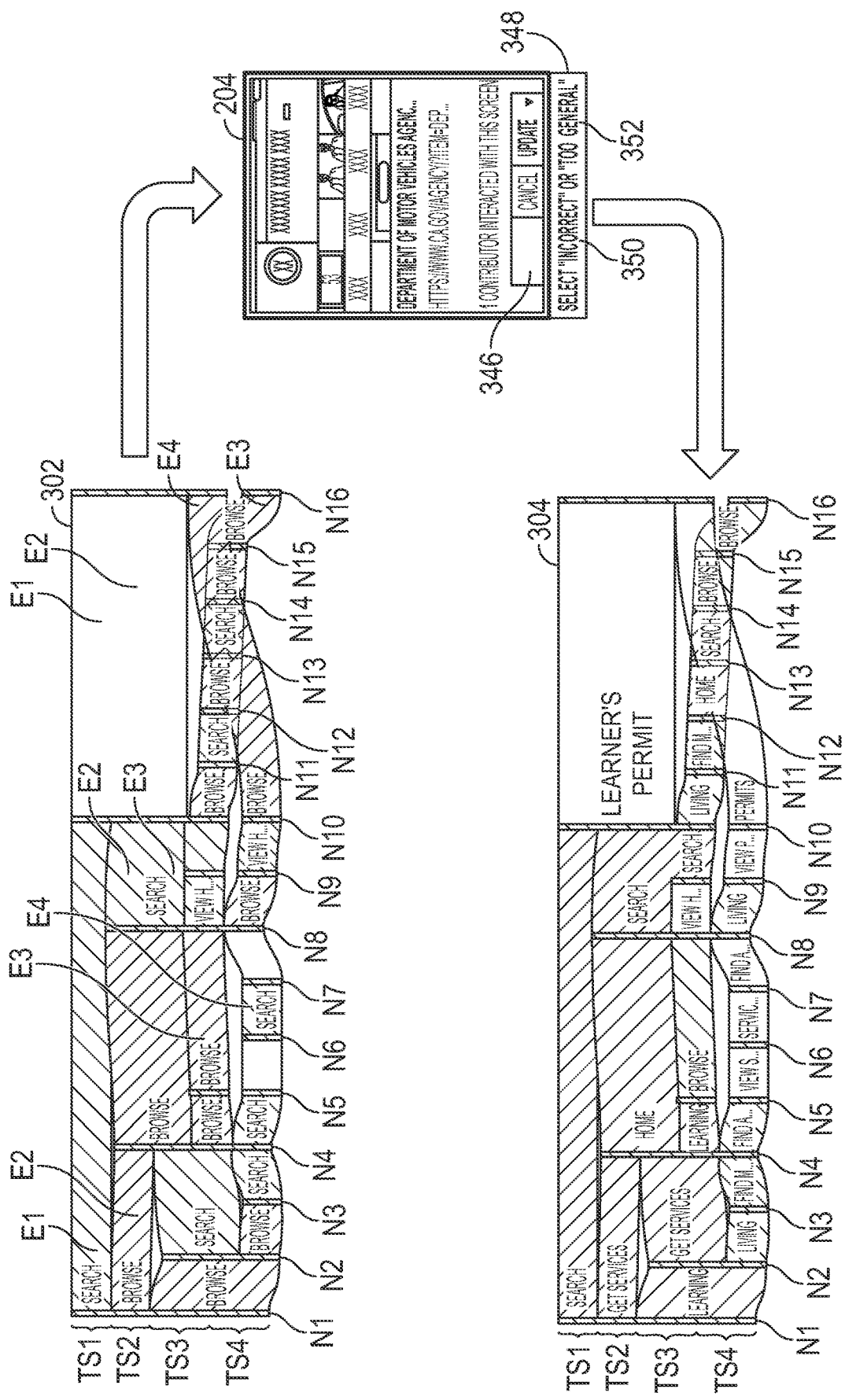
FIG. 3B is an illustrative drawing showing an example first Sankey diagram and an example Sankey diagram representing test user interactions with the example digital asset/web page of FIG. 3A.

FIG. 3B is an illustrative drawing showing an example first Sankey diagram 302 and an example Sankey diagram 304 representing test user interactions with the example first digital asset/first web page 320 of FIG. 3A. The first Sankey diagram 302 includes initial/starting intent labels generated based upon a generic/global embedding before refinement to customize the embedding for the language domain of the State DMV website. The second Sankey diagram 304 includes updated intent labels generated based upon a customized embedding produced in response to analyst/admin user request to update the generic/global embedding to conform to the ontology, including the language domain, of the State DMV website. A pop-up update user interface UI 204 is displayed on a computer display screen for use by an analyst/admin user to provide feedback input to request updating of the embedding.

A Sankey diagram can be produced at display operation 128 of FIG. 1B to serve as a representation of test user interaction with a digital asset 102. A Sankey diagram provides a type of a visualization commonly used to depict a flow from one set of values to another. A Sankey diagram typically shows connections among items often referred to as nodes. The connections between nodes in a Sankey diagram are referred to as edges. Sankey diagrams are commonly used to show a many-to-many mapping between two functional regions or multiple paths through a set of stages. Given multiple visual element interaction sequences during each of which, a different test user performs a set of tasks, a Sankey diagram can aggregate test user interaction journeys across sessions into nodes in which each node represents a screen.

The example first and second Sankey diagrams 302, 304 include edges E1-E4 that represent interaction sequences captured for respective test user sessions for first to fourth test users, TS1-TS4. The first and second Sankey diagrams 302, 304 include nodes N1-N16 that correspond to web pages visited by the test users. The first and second Sankey diagrams 302, 304 include intent labels that set forth inferred test user intent during interactions with the example digital asset/first web page 320 represented by different edge segments. For example, referring to the first Sankey diagram, intent of the first test user TS1 between node N1 and node N10 is labeled as "search", which is displayed on a segment of the first edge E1 between node N1 and node N10.

In operation, the first and second Sankey diagrams 302, 304 and the update UI 204 can be displayed on a device screen display. An analyst user can use the update UI 204 to associate a displayed starting label in the first Sankey diagram 302 and to associate the starting label with a new custom label. The new custom label can be used to update the displayed starting labeling of the first Sankey diagram 302 to produce the updated labeling of the second Sankey diagram 304, which may be customized for use in an identified group having a specific language domain. Other than label changes, the example first and second Sankey diagrams 302, 304 are identical.

Different labels are used for corresponding test user activity represented in the first and second Sankey diagrams 302, 304 where language domain-specific labels of the State DMV website differ from the initial/generic labels used in the first Sankey diagram 302. For example, test user interaction activity of the second test user TS2 with the digital asset/first web page 320 between nodes N1-N4 is labeled with the initial/generic label "Browse" in the first Sankey diagram 302, and is labeled with the State DMV language domain-specific label "Get Services" in the second Sankey diagram 304. It can be seen that in this example, the label "Get Services" associated with the second Sankey diagram 304 for test user TS2 at nodes N1-N4 is similar to text "Getting Services" on the button 322 in the example digital asset/web page 320. Also, for example, test user interaction activity of the third test user TS3 with the digital asset/first web page 320 between nodes N10-N11 is labeled with the initial/generic label "Browse" in the first Sankey diagram 302 and is labeled with the State DMV language domain-specific label "Living" in the second Sankey diagram 304. In this example, the label "Living" associated with the second Sankey diagram 304 for test user TS3 at nodes N10-N11 matches text "Living" on the button 330 in the example digital asset/web page 320.

An example pop-up update UI 204 includes a label input field 346 in which an analyst/admin user can input an updated label. The example update UI 204 includes a dropdown menu 348 in which an analyst/admin user can select guidance for performing an embedding update. An example update UI 204 provides a dropdown menu selection between "Incorrect" 350 and "Too General" 352. Thus, an analyst user advantageously can designate an update intent label that more clearly expresses test user intent using language that is customized to a particular language domain. As explained below, the update UI 204 can be used to provide control input to adjust an embedding vector space 122, 209 by adjusting an association, within the embedding vector space 122, 209 between a label and an embedding vector corresponding to a test user's interactions with the one or more interactive elements. The update UI 204 also can be used to provide control input to create a new label and a corresponding association, within the embedding vector space, with an embedding vector corresponding to the test user's interactions with the one or more interactive elements. The update of an embedding vector space 122, 209 ensures that the intent label changes are persistent. The embedding vector database control 208 can use the adjusted and/or newly created associations within the embedded vector space 209 to produce intent labels for a future test user's interaction with visual elements.

Figure 4:
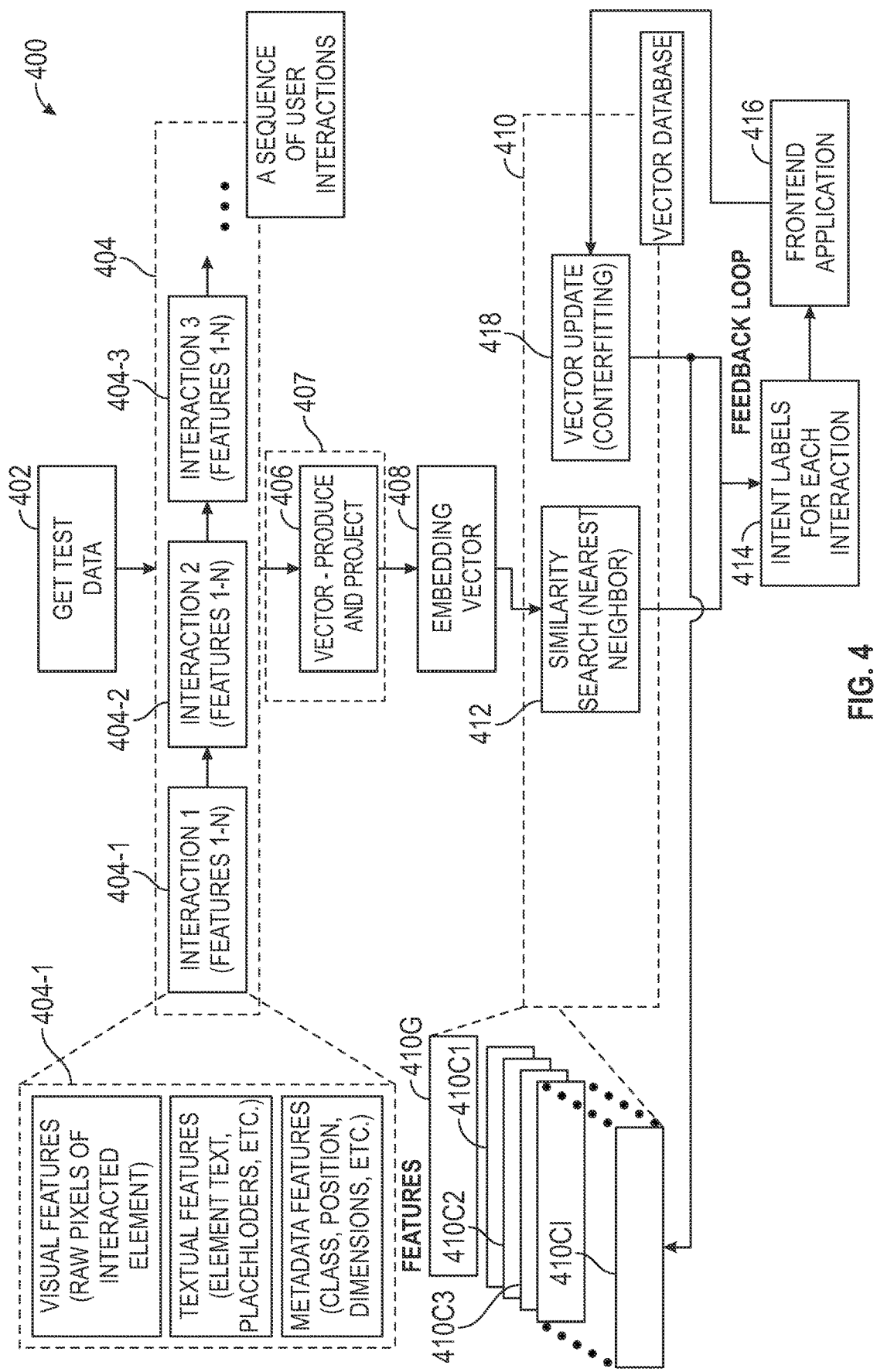
FIG. 4 is an illustrative flow diagram representing an example machine learning model-based method to infer intent labels based upon test user digital asset interactions and to update an embedding vector space based upon analyst/admin user feedback.

Machine Learning Model for Group-Specific Language Domain-Based Adjustment of Custom Embedding Vector Space FIG. 4 is an illustrative flow diagram representing an example method 400 to infer intent labels based upon test user digital asset interactions and to update an embedding vector space 122, 209 based upon analyst/admin user feedback, in accordance with some embodiments. An example computing machine 1900 shown in FIG. 19 can be specially configured according to computer executable code to implement the operations of method 400. Operation 402 receives test user interaction data 404 that includes information describing a sequence of test user interactions 404 with a digital asset. The example interaction data 404 sets of information describing interactions 404-1, 404-2, and 404-3 captured during a test user session. In an example method, each set of captured test user interaction is represented by up to N features. An exploded representation of information describing a first test user interaction 404-1 in the sequence shows that the features can include visual features such as raw pixels, can include textual features such as element text and placeholders, and can include metadata features such as class, position, and dimensions. Example operations 402 and 404 correspond to and are an example implementation of the interaction data capture operation 126 of FIG. 1B.

A vector generation and projection operation 406, which creates one or more corresponding M-dimensional embedding vectors 408 based upon the interaction data sequence 404, and projects the embedding vector into an M-dimensional embedding vector space 410. A trained machine learning model 506, described below with reference to FIGS. 5A-5B, can be used to project an embedding vector 408 to the embedding vector space 410. Each embedding vector 408 can represent one or more of the test user interactions. The embedding 410 includes intent labels that can indicate test user intent. Different intent labels identifying different test user intents are located at different vector-based locations within the embedding 410. The machine learning model 506 is trained to project an embedding vector 408 into the embedding vector space 410 at a vector-based location that is nearby to a vector-based location of a label that identifies intent associated with the sequence of test user interactions represented by the vector 408. The vector generation and projection operation 406 corresponds to and is an example implementation of the vector projection operation 130 of FIG. 1B. The embedding 410 of corresponds to and is an example implementation of the embedding 122 of FIG. 1B.

As indicated in the exploded view and as explained more fully below, the embedding vector space 410 includes a global embedding vector space 410G and a plurality of custom embedding vector spaces 410C1-410Ci. Each custom embedding space 410C1-410Ci corresponds to a different group language domain. During operation of the process 400, one of the custom embeddings 410C1-410Ci is selected based upon a unique identifier associated with the vector 408 that identifies a group on whose behalf the process 400 is performed. The machine learning model 506 projects an embedding vector 408 into both the global embedding vector space 410G and a custom embedding vector space from among custom embeddings 410C1-410Ci, identified based upon a received group identifier. Operation 412 performs a nearest neighbor similarity search in both the global embedding vector space 410G and an identified custom embedding vector space 410C to identify nearest neighbor intent labels in the respective spaces that correspond to the projected embedding vector 408. As explained more fully below, different nearest neighbor search results may be provided for the vector space 410G and for the identified custom embedding vector space 410C. In determining nearest neighbor search result to return, operation 412 prioritizes a nearest neighbor label located in the identified custom embedding vector space 410C over a nearest neighbor label located in the global embedding vector space 410G, and outputs a nearest neighbor label 414. An example frontend application 416 produces a Sankey diagram and is used to display the intent labels and update them with user feedback via API 206. An example frontend application operation 416 can produce a display on a display screen that shows a Sankey diagram that includes edges that represent test user interactions and in which the edges are labeled with the intent labels determined based upon similarity search operation 412 that indicate predicted test user intent associated with the interactions. The frontend application 416 corresponds to and is an example implementation of the label update request operation 134. The frontend application 416 also corresponds to the interactive update UI 204 and a vector operations API 206 of FIG. 2A. The example first Sankey diagram 302 of FIG. 3B, with a starting intent label, can be produced based upon operation 416 and the determined nearest neighbor label 414.

Operation 418 corresponds to operations of the embedding vector database control 208 of FIG. 2A. Operation 418 can use analyst/admin user commands presented via the example update UI 204 of FIG. 3B to selectably to update the selected custom embedding 410C by causing an adjusting of an association of an existing label within the selected custom embedding 410C with a projected embedding vector 408. Alternatively, operation 418 can receive analyst/admin user control input to cause updating of the selected custom embedding 410C by creating a new label and a corresponding new association of the new label with a projected embedding vector 408. Operation 418 also can update the identified intent labels 414 displayed in an example representation of test user interactions, e.g., update a Sankey diagram, based upon analyst/admin input received at the frontend operation 416. For example, the second Sankey diagram 304 of FIG. 3B, with updated intent labels, can be produced based upon operation 418.

Figures 5A, 5B:
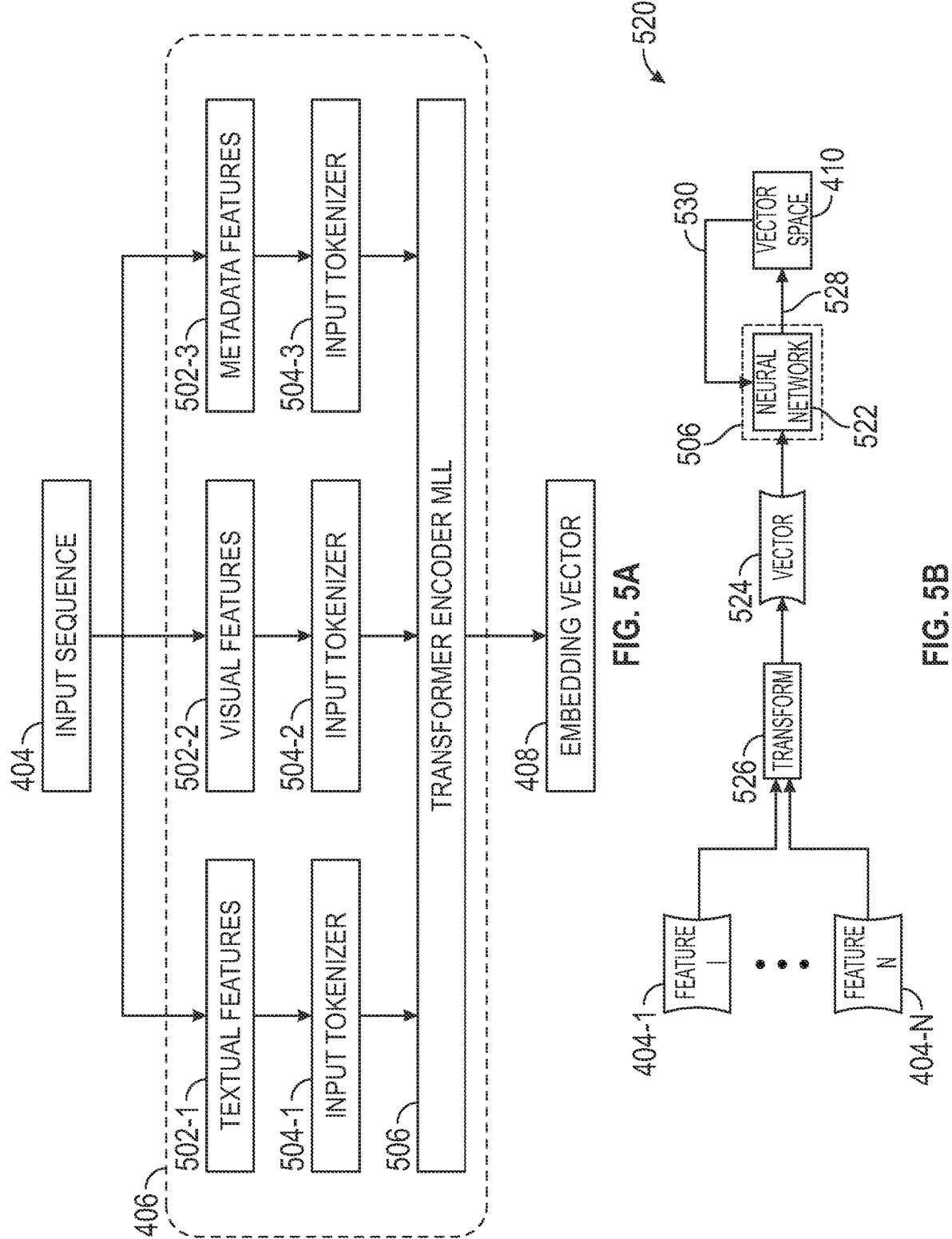
FIG. 5A is an illustrative flow diagram representing certain details of a method of generating an embedding vector.
FIG. 5B, the example machine learning model training method to train the machine learning model of FIG. 5A.

FIG. 5A is an illustrative flow diagram representing certain details of a method 500 used by the example vector projection operation 406 of FIG. 4 to use the trained machine learning model 506 to generate an embedding vector 408 based upon a test user interaction information sequence 404, in accordance with some embodiments. The method 500 receives an interaction input sequence data 404 as input information. The input information includes multiple modes of features: textual mode features 502-1, visual mode features 502-2, and metadata mode features 502-3. The textual features 502-1 are provided to a first tokenizer 504-1, which tokenizes the textual features 502-1. The visual features 502-2 are provided to a second tokenizer 504-2, which tokenizes the visual features 502-2. The metadata features 502-3 are provided to a third tokenizer 504-3, which tokenizes the metadata features 502-3. Each tokenizer 504-1, 504-2, 504-3 splits the feature information that it receives into a sequence of meaningful parts that can be embedded in a vector space. For example, text may be split into smaller units called tokens (e.g., words or word segments). The tokenized feature information is provided to a trained machine learning model (MLL) 506 configured to implement a transformer encoder MLL, which produces an embedding vector based upon the output of the tokenizers 504-1, 504-2, 504-3, which can be projected into embedding vector space 410.

An example transformer encoder MLL 506 includes a neural network architecture that can convert sequential input, such as a sequence of words in a sentence, to an embedding vector. More particularly an example transformer encoder MLL 506 is configured to transform a tokenized sequence of user interaction features associated with user interaction with a digital asset to an embedding vector 408. An alternative MLL network architecture that can be used to transform a tokenized sequence of user interaction features across a digital asset can include one of a recurrent neural network (RNNs) or long short-term memory (LSTMs), a type of RNN to transform tokenized features to an embedding vector.

FIG. 5B, the example ML model training method 520 employs machine learning to train an artificial neural network 522 of the machine learning model 506 of FIG. 5A, based upon sequences of interaction feature data 404-1 to 404-N, to project training vectors 524 to train the embedding vector space 410. Operation 526 transforms respective sequences of training data 404-1 to 404-N to respective training vectors 524 suitable for input to an input layer of the neural network 522. Edges 528, 530 represent an iterative training process in which the neural network 522 is trained to project vectors including vectors that represent intent labels to an embedding vector space 410 to train the embedding vector space 410 to associate interaction feature data with labels.

Projecting an Interaction into an Embedding Vector Space

The method of FIGS. 4-5A to predict intent labels based upon test user interactions and to update an embedding vector space 122, 209, 410 based upon analyst/admin user feedback relies upon projecting vectors that represent test user interactions into an embedding 122, 209, 410. The use of vector projection to search for/predict intent labels involves a nearest neighbor similarity search. An embedding vector is projected nearby to one or more intent label vectors within an embedding 122, 209, 410 and a nearest neighbor search is performed to determine a predicted intent label. The use of vector projection obviates the need to instrument test code to generate intent labels based upon test user interactions, which has been a common approach.

Figure 6:
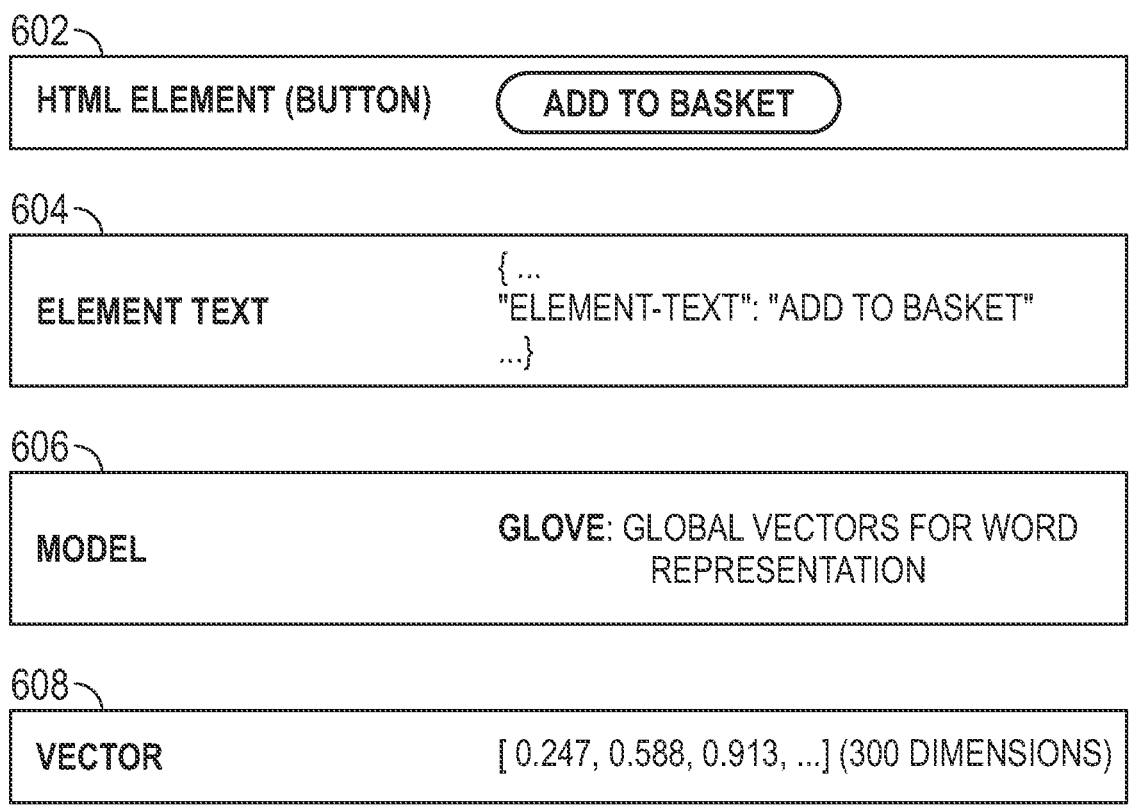
FIG. 6 is an illustrative drawing representing an example sequence of steps used to produce an embedding vector based upon test user interaction with a digital asset.

FIG. 6 is an illustrative drawing representing an example sequence of steps used to produce an embedding vector based upon test user interaction with a digital asset 102. In this example, first, a test user interacts with an HTML button 602 having text, "Add to Basket", which is displayed by a digital asset 102. Second, the interaction data capture operation 126 collects an element text feature, "Add to Basket" 604 associated with the HTML button. Third, a pre-trained machine learning model uses a pre-trained embedding space 606 to convert the text feature 604 to a multi-dimensional vector 608. A pre-trained embedding in accordance with an example embodiment uses the GloVe embedding vector space, which uses floating point numbers to represent vectors, and uses a 300-dimension embedding vector space.

Initial Intent Ontology/Global Embedding Vector Space

The inventors have created a starting intent label vocabulary comprising initial/starting intent labels that can be used to predict intent labels for test user interactions with a digital asset. Pre-trained word embeddings are used to place the starting labels in a semantically significant space that the vector producing and projection operation 406 can use to make predictions based upon interaction features. An example starting vocabulary consists of multiple initial/starting labels, also referred to herein as "global" labels that correspond to common interactions that a test user can perform when interacting with a digital asset. An example starting vocabulary includes seventy-one (71) starting intent labels. The example starting vocabulary includes behavioral and industry-based words and phrases (e.g. "Buy" and "Search", as well as "View profile" and "Enter delivery info"). Each intent label also has a list of possible interaction features associated with it. For instance, "Add to cart" can be associated with the possible element text features "Add to bag," "Add to basket" and so on. The multiple example starting intent labels represent a set of common context-agnostic intents.

A starting ontology, also referred to herein as a global ontology, serves as a base of an embedding vector space that includes label vectors and feature vectors. The multiple starting labels act as 'global labels', common to test users from multiple different groups associated with different language domains. If a user group has not added any custom labels, then all predicted intent labels are returned from among the global labels. Initial global labels are placed within a global embedding vector space 410G according to semantic significance using pre-trained vectors. An example ML model 407 uses pre-trained vectors from the GloVe language model. See, Jeffrey Pennington, Richard Socher, and Christopher D. Manning. 2014, GloVe: Global Vectors for Word Representation. In Empirical Methods in Natural Language Processing (EMNLP). 1532-1543. An example ML model 407 uses the pre-trained vectors from the GloVe language model as a base of a global embedding vector space 410G. For example, using the GloVe vectors, an embedding for a vector for the interaction such as "Add to Cart" can be placed near a pre-trained label vector for the words "Buy" or "Purchase", rather than in a random part of a global embedding vector space 410G. As explained more fully below, the initial ontology and the embedding vector space based upon pre-trained vectors establish a baseline of semantic significance, which allows the ML model 407 to understand where to place custom intent labels when analyst users add them to a selected custom embedding vector space 410C.

Figure 7A:
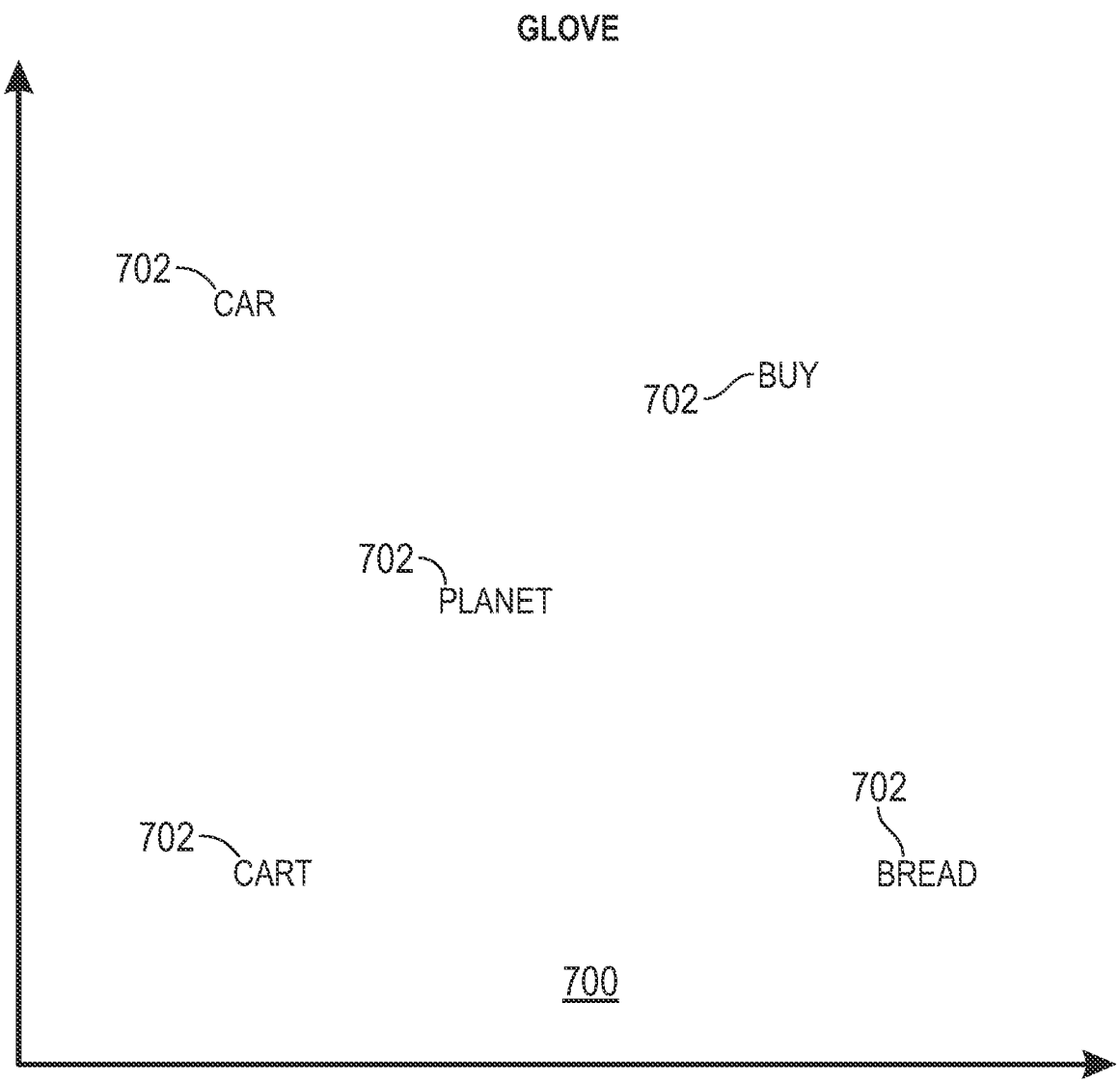
FIG. 7A is an illustrative drawing representing pre-populated words located within an example pre-existing starting/global vector space.

FIG. 7A is an illustrative drawing representing prepopulated words 702 located within an example pre-existing starting/global vector space 700, in accordance with some embodiments. Approximate locations of the prepopulated words 702 within the pre-existing vector space are known. The vectors of the pre-existing vector space are used as a coordinate system for an embedded vector space 122, 209, 410. Vectors for intent labels can be placed within the pre-existing vector space based upon the pre-existing vectors in that space. An example embodiment uses the GloVe embedding vector space to provide the starting vector space as explained above. The GloVe embedding vector space is trained with over 100 million words to project into the GloVe embedding vector space.

Figure 7B:
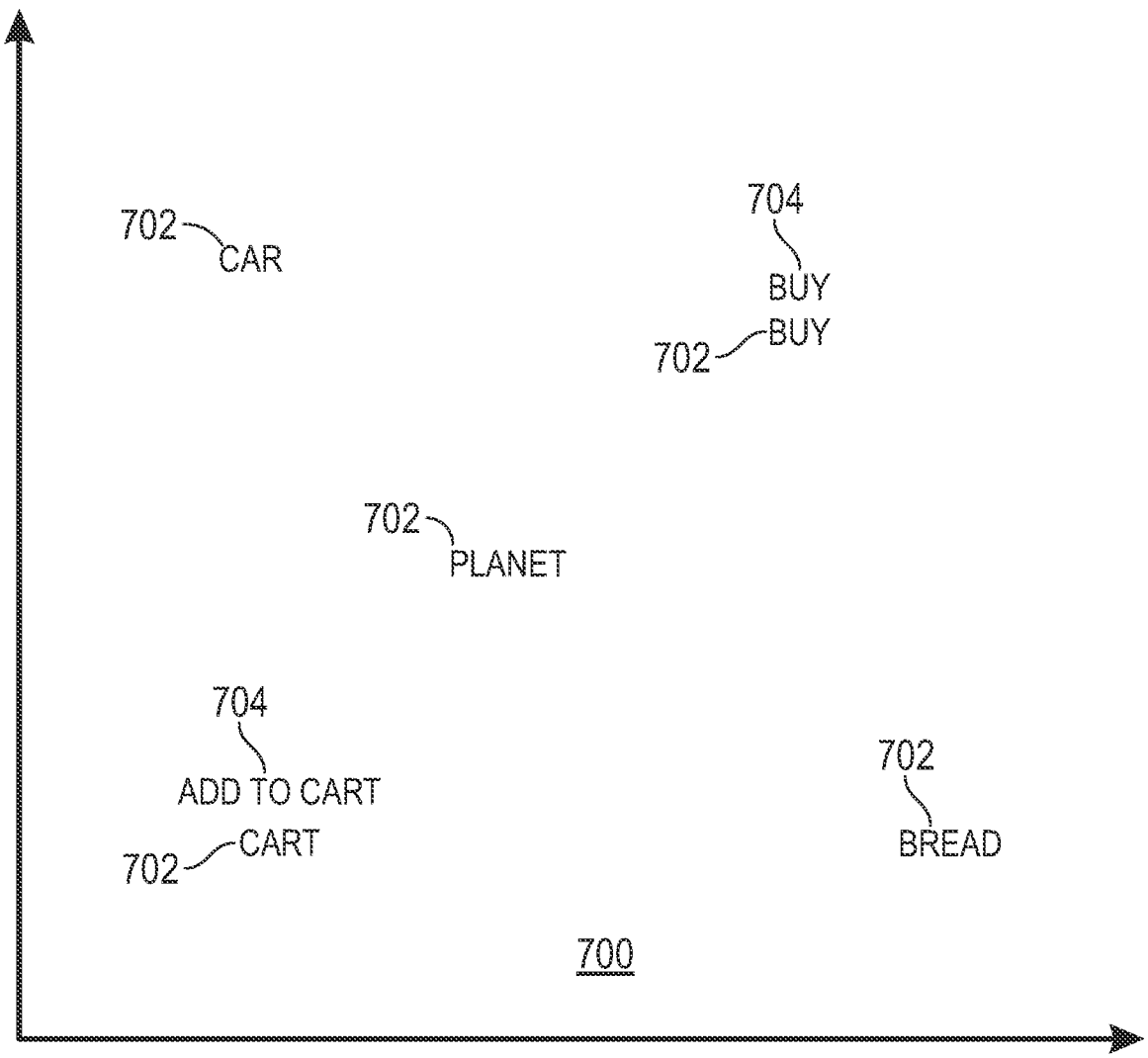
FIG. 7B is an illustrative drawing representing pre-populated words and starting global labels within the example pre-existing starting/global vector space.

FIG. 7B is an illustrative drawing representing prepopulated words 702 and starting global labels 704 within the example pre-existing starting/global vector space 700, in accordance with some embodiments. The starting global labels 704 can be manually selected from a pre-existing 'intent ontology', which comprises a collection of words that classify user interaction behavior with specific intent labels/tags. An example ML model 407 to implement the vector projection operation 406 is trained using the starting global labels 704 to place them at locations within the pre-existing starting vector space 700. The starting/global labels are non-custom. Starting/global labels are selected to not be specific to a language domain of a particular group, although a group may use one or more starting/global labels within its specific language domain. Starting/global labels are selected to provide a base set of labels usable by different groups with different language domains as a basis to start or bootstrap the process of creating custom embeddings based upon associated specific language domains. Prepopulating prepopulated words 702 within a pre-existing vector space 700 having a predetermined coordinate system is used to avoid the 'cold start' problem of deciding where to place the global labels 704 within a vector space for use to label edges in Sankey diagrams. More specifically, the prepopulated words 702 in the pre-existing vector space coordinate system are used to determine where to place the global starting labels 704 within the pre-existing vector space 700.

Figure 7C:
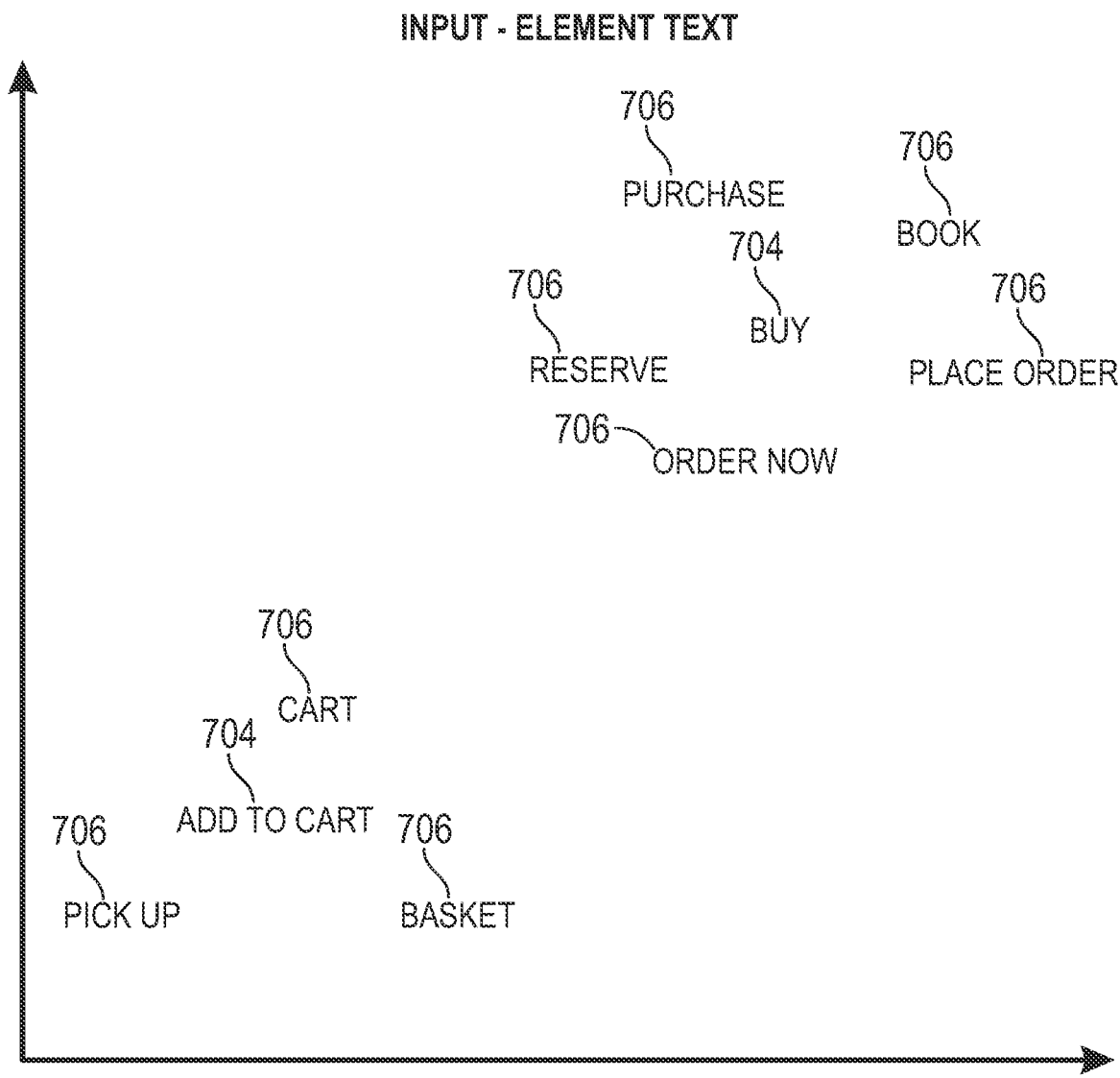
FIG. 7C is an illustrative drawing representing pre-populated words and a set of starting element text strings within the example pre-existing starting/global vector space.

FIG. 7C is an illustrative drawing representing pre-populated words 702 and a set of starting element text strings 706 within the example pre-existing starting vector space 700, in accordance with some embodiments. The element text strings represent text features that often occur as a result of user interaction behavior. An example ML model 407 to implement the vector projection operation 406 is trained using the set of starting/global labels 704 and the starting element text strings 706 to place the starting element text strings 706 at locations within the pre-existing starting vector space 700. The starting element text strings are global and cluster around the starting global labels 704. Once the pre-existing starting vector space is pre-populated with global labels 704 and starting element text strings using certain predetermined vectors, the rest of the predetermined vectors (e.g., the rest of the GloVe vectors) are no longer needed. The starting global labels 704 are outputs. The starting element text 706 forms clusters of inputs about the global label outputs.

Embedding Vector Space Refinement

Referring again to FIG. 3B, an analyst/admin user can provide control input to refine the embedding vector space 122, 209, 410 via the update UI 204. An analyst/admin user can observe starting/global labels displayed at the first Sankey diagram 302, for example, and determine whether to replace a displayed starting global label describing a particular user interaction behavior with a different custom label that uses language that better conforms with language used in a particular language domain to describe that particular test user behavior. To change a starting/global label, an analyst/admin user provides control input to the update UI 204. The control input can comprise a feedback command that indicates a label change to make. As explained more fully below, a label change not only causes a label change in a currently displayed Sankey diagram as indicated by the difference in labels displayed in the first and second Sankey diagrams 302, 304 shown in FIG. 3B, but also, causes an update of the embedding vector space 122, 209, 410. The change in the embedding vector space is important since it is a persistent change that can influence what labels are applied in response to future test user interactions. An analyst/admin user can provide a feedback command that is either explicit or implicit. In an example update UI 204, explicit feedback commands include, "Too general", "Inaccurate", or "Other". An implicit feedback command is presumed/used when the user makes no selection, Referring to FIG. 2A, an analyst/Admin user's input feedback command received at the update UI 204 is provided to the vector operations API 206, which in turn, provides a corresponding request for vector operations to the embedding vector database control 208, which updates the example embedding vector database 209 based upon the analyst user feedback command. These functional operations can place a custom label in a semantically significant place with respect to the rest of the embedding vector space. For example, a custom label "Buy a car", added to an example embedding 209 by an analyst user based upon a language domain of a car company might be placed in the embedding vector space close to the labels "Buy" or "Add to cart" (depending on the feedback command) because those labels all have semantically similar meanings. Referring now to FIG. 4, as explained more fully below, in the future, when interactions of a future test user are received in which test users encounter the same element text, the similarity search operation 412 will surface within a selected custom embedding 410C.

Referring to FIG. 2A-4, based upon a test user interacting with an interaction element that includes element text, a corresponding embedding vector 408 is produced that represents the element text. At operation 412, a request is made to the vector operations API 206 to get a predicted label for an identified group for the element text. The vector operation API 206 uses the embedding vector database control 208 to access an embedding vector space that can be customized to include words that conform with a language domain associated with an identified group for display at the first Sankey diagram 302. An analyst/Admin user can provide implicit or explicit feedback via the update UI 204 to adjust a selected custom embedding 410C associated with a language domain associated with an identified group. The update UI 204 can communicate the Analyst/Admin user's feedback to the vector operations API 206, which in turn, communicates with the embedding vector database control 208 to adjust a custom embedding associated with a language domain of an identified group according to the feedback. The embedding vector database control 208 can adjust an embedding vector space using attract and repel functions. See, Mrkšić et al., 2016, Counter-fitting word vectors to linguistic constraints, arXiv preprint arXiv:1603.00892 (2016). The embedding vector database control 208 also can adjust an embedding vector space to create and insert new vectors into the space.

In an example embodiment, vector updates, creations, and queries are handled using microservice APIs implemented with GraphQL, to present a single interface of vector operations. The operations supported by the vector operations API 206 include finding a predicted label for element text, finding the nearest neighbors for an element text vector, inserting/updating/deleting vectors into the database, and creating custom labels for customer specific needs. This vector operations API 206 serves as a layer between the embedding vector database control 208, which can store and access multiple different language domain specific embedding vector spaces and update UI 204, and which can perform several functions:

Create: add an item to the vector database where it was previously absent

Perturb: move an item within a vector database by adding random noise

Repel: move an item away from another item within the vector database

Attract: move an item closer to another item within the vector database

In an example control 208, the vectors in the language domain specific embedding vector spaces are normalized, meaning they are between 0 and 1. In an example control 208, the perturbation factor is 0.01, meaning that at most a perturbed vector will be 1% different from the original vector. The attract function uses Cosine distance to continuously pull a vector closer until the distance between the two vectors is below a certain threshold (0.0). Conversely, the repel function uses Cosine distance to continuously push a vector away until the distance between the two vectors is above a certain threshold (1.0).

Vector creation can be used to insert custom labels or element text vectors created by analyst users into a language domain specific embedding vector space. Perturbation is often used in conjunction with vector creation when a created vector is semantically similar to existing vectors in the space, so that the embedding space maintains its semantic integrity. The repel and attract functions can be used to move element text vectors away from "incorrect" labels, and closer to "correct" labels, respectively.

Embedded Vector Space Refinement

Figure 8:
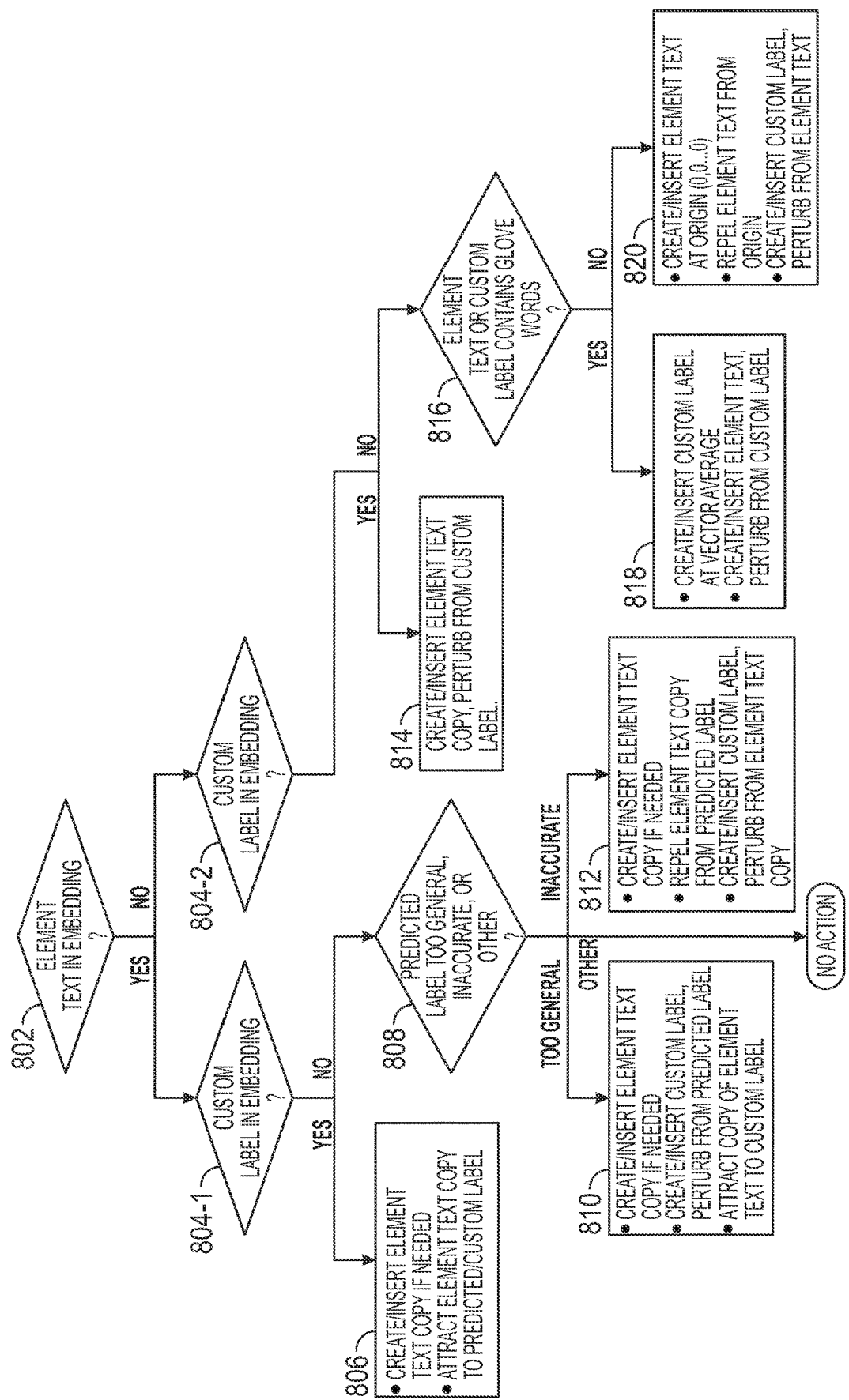
FIG. 8 is an illustrative flow diagram representing an example embedded vector space refinement process to customize a custom embedding vector space.

FIG. 8 is an illustrative flow diagram representing an example embedded vector space refinement process 800 to customize a custom embedding vector space, in accordance with some embodiments. As explained above with reference to FIG. 4, multiple custom embedding spaces 410C1-410Ci can be provided, each corresponding to a different language domain. An example computing machine 1900 shown in FIG. 19 can be specially configured according to computer executable code to implement operations of the method 800. The example refinement process 800 can be implemented at operation 418 of the method 400 of FIG. 4.

Different language domains can have different customized embedding vector spaces. The example process 800 can be used to customize a language domain-specific embedding vector space based upon feedback commands received at the update UI 204. Operation 802 of the example process 800 first checks whether element text already exists in a selected language domain-specific embedding vector space. Next, operation 804-1, 804-2 determine whether a custom label provided already exists in a currently selected language domain-specific embedding vector space, either as a previously added custom label or as global label. Based upon these factors, as well as feedback provided by an analyst user, the vector operations API 206 and the embedding vector database control 208 will cooperate to control different vector functions to personalize the language domain-specific embedding vector space, either through creating and inserting new vectors, or attracting/repelling existing vectors.

Examples—Refining an Embedded Vector Space to Create a Custom Intent Label

Figure 9:
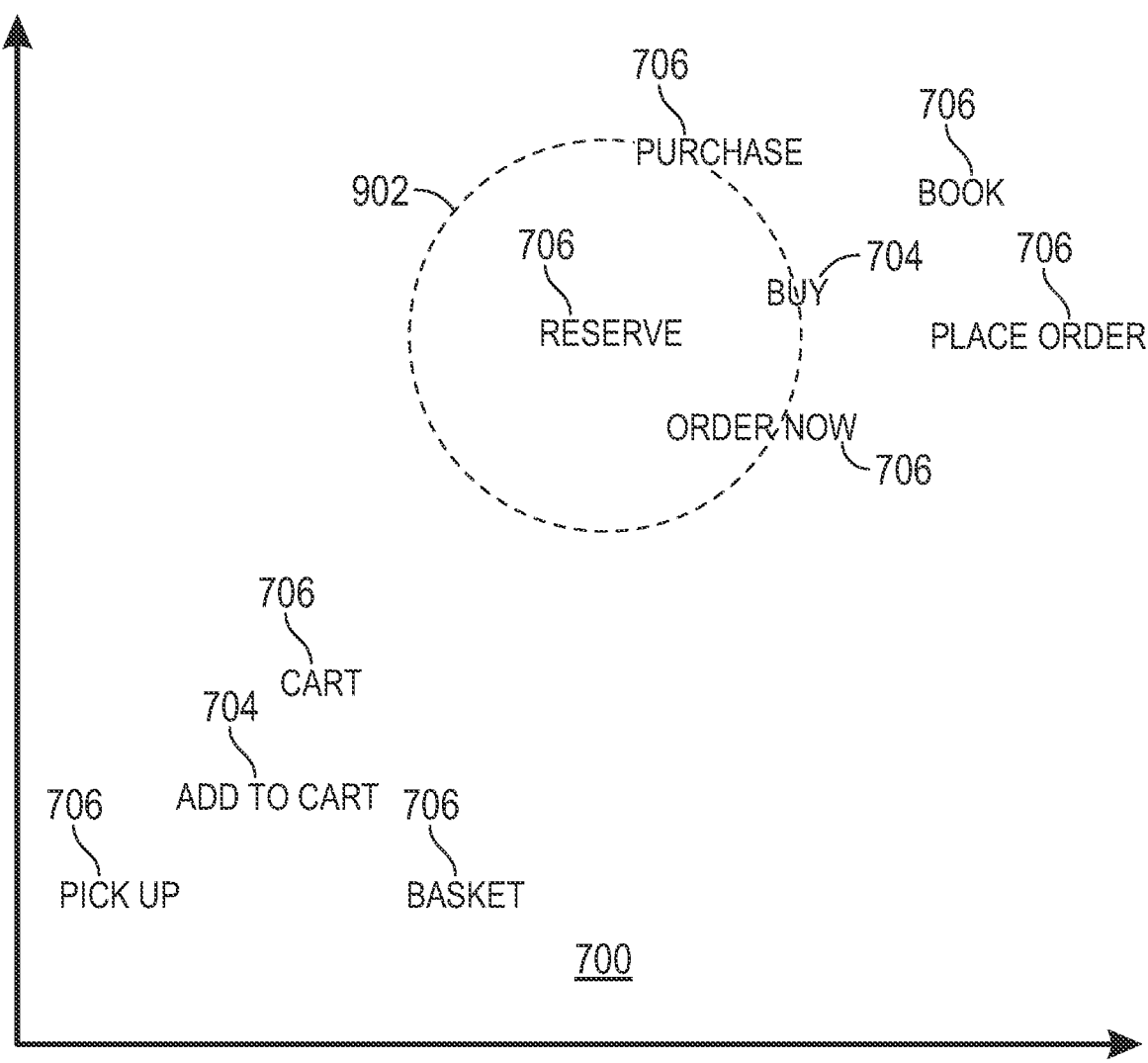
FIG. 9 is an illustrative drawing representing results of a nearest similarity search within an example embedded vector space.

FIG. 9 is an illustrative drawing representing results of a nearest similarity search within an example embedded vector space 700, in accordance with some embodiments. The embedded vector space 700, which is the same as that set forth in FIG. 7C, includes starting global labels 704 and starting element text strings 706. In this example, a test user has selected (e.g., clicked on) a visual display element associated with the element text "reserve". Results of a nearest neighbor similarity search using operation 412, represented by the dashed-line circle 902, indicates that the starting global label "Buy" is the nearest neighbor to the element text "reserve" within the embedding vector space 700. The global label "Buy" is displayed on a corresponding representation of test user interaction, e.g., a Sankey diagram.

Figure 10A:
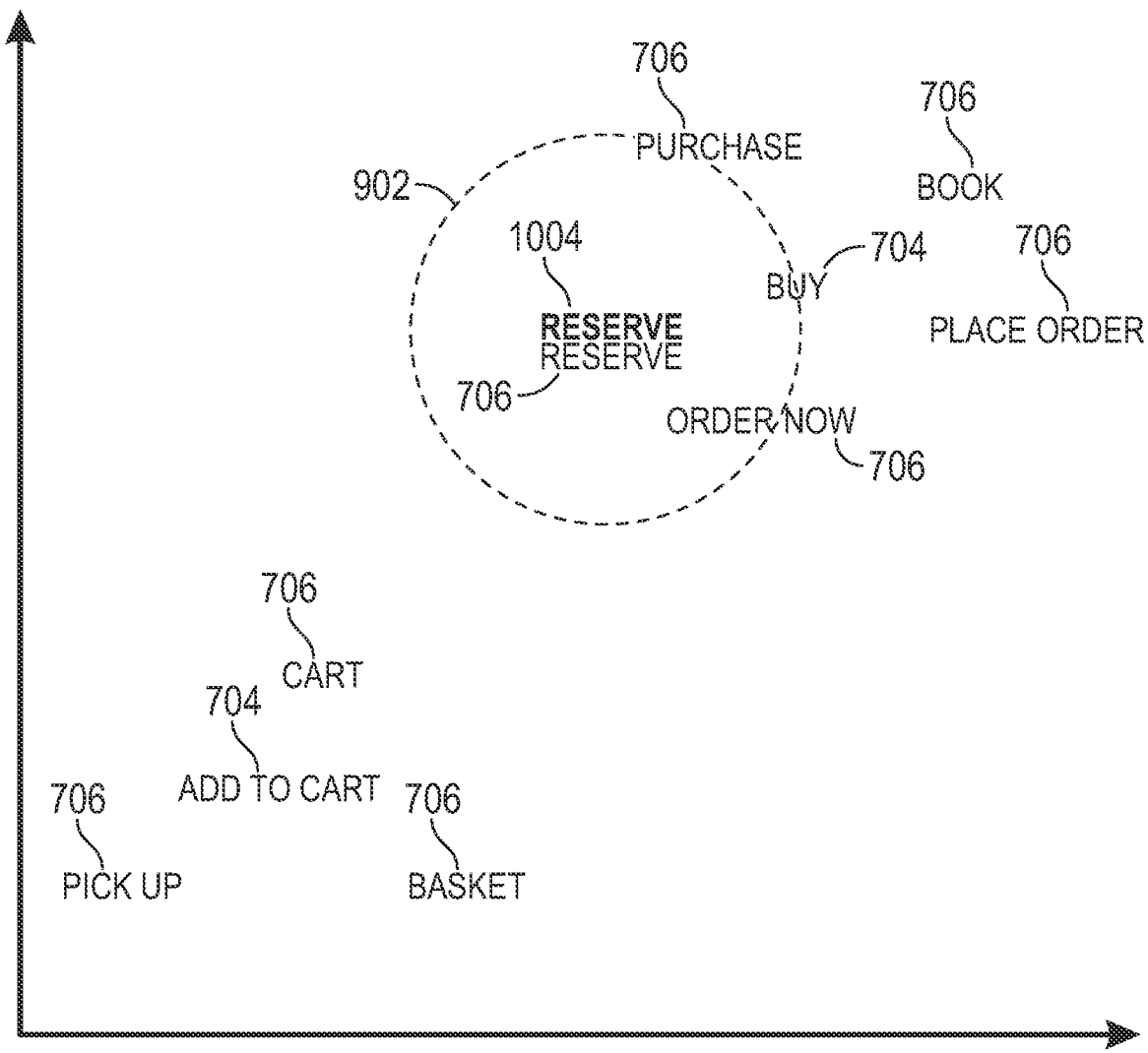
FIGS. 10A-10B are illustrative drawings representing updating of an embedding vector space based upon first branch operations of the example refinement process in which an element text is present in the embedding and a custom label is present in the embedding.
Figure 10B:
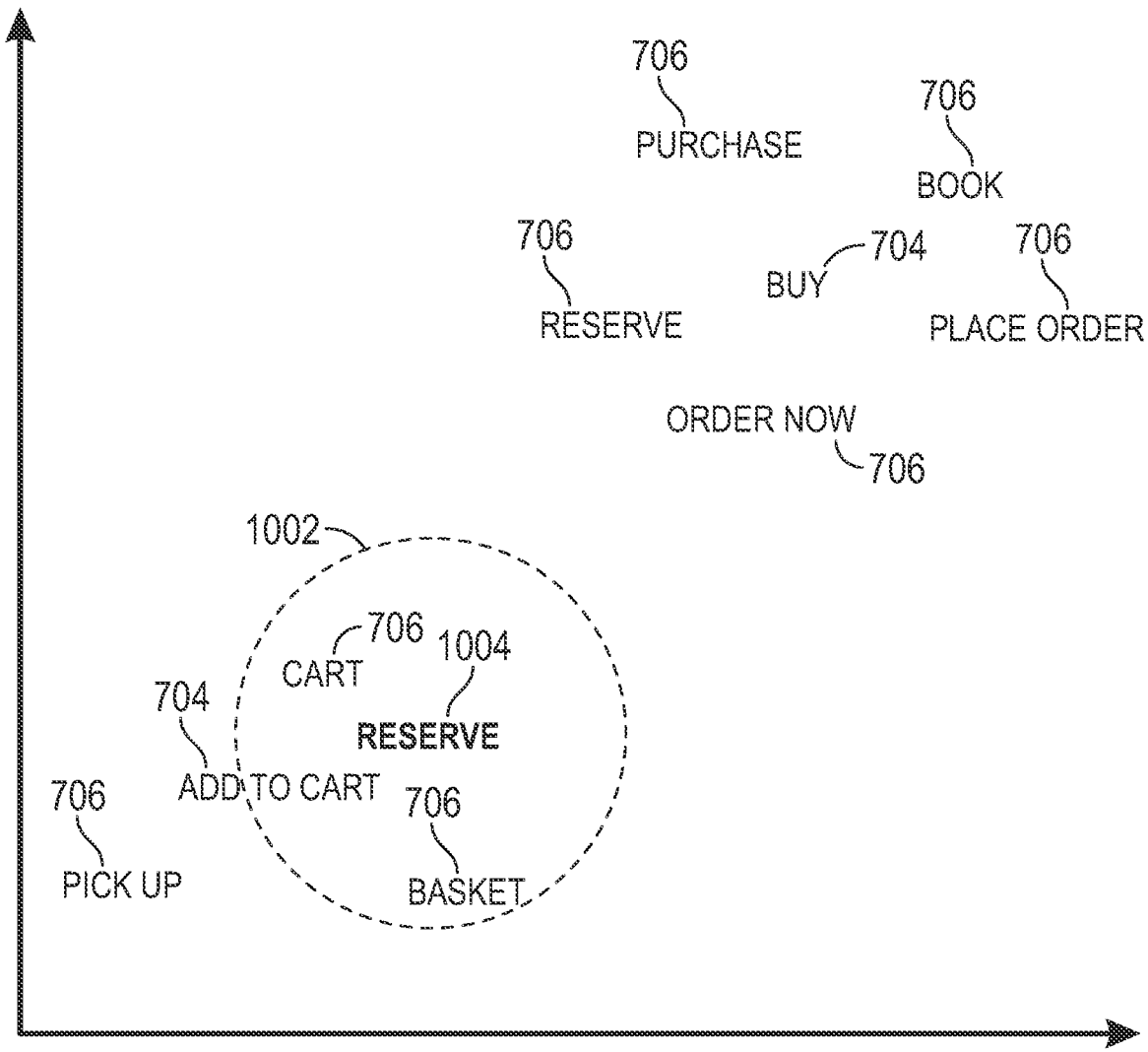

FIGS. 10A-10B are illustrative drawings representing updating of an embedding vector space based upon first branch operations of the example refinement process 800 in which an element text is present in the embedding and a custom label is present in the embedding. The example operations of FIGS. 10A-10B add a custom label to the custom embedding vector space and associate the custom label as a nearest neighbor to the element text. Referring to FIG. 8, the first branch of the refinement process 800 includes operation 802, operation 804-1 and operation 806. Operation 802 is a decision operation that determines whether a search result includes an element text embedding. Control flows to operation 804-1 in response to a determination that the search result includes an element text embedding. Operation 804-1 is a decision operation that determines whether a search result includes a custom label embedding. Control flows to operation 806 in response to a determination that the search result includes a custom label embedding. Operation 806 includes a create/insert vector operation and an attract vector operation. The first branch operations can be prompted by an analyst/admin user feedback command requesting a change in a current label associated with element text in an embedding vector space. In this example, it is assumed that the nearest neighbor similarity search results in the element text "reserve" being associated with the global label "Buy" as shown in FIG. 9. However, assume that in this example an analyst user prefers that the element text "reserve" be associated with the Global label "Add to cart".

In this example, control input received at the update UI 204 requests to change the nearest neighbor association of the element text "reserve" from being nearest to the label "Buy" to being nearest to the "Add to cart" label. In response, to the feedback command at the update UI 204, the vector operations API 206 provides a request to the embedding vector database control 208 to implement the requested adjustments to associations between the element text "reserve" and the labels "Buy" to the label "Add to cart" within the embedding vector space 700. In an example embodiment, the embedding vector database control 208 creates a custom copy 1004 of the element text "reserve" as shown in FIG. 10A. The embedding vector database control 208 assigns a group identifier (e.g., a UUID) to the element text "reserve" custom copy 708 to designate the custom copy 708 as being group domain-specific element text associated with a particular language domain-specific embedding vector space. Since the analyst/admin user's preferred label "Add to cart" already exists in the embedding vector space 700, the embedding vector database control 208 uses the attract vector operation to move the custom copy 1004 of the "reserve" element text to a location within a language domain-specific custom embedding vector space that is closer to the "add to cart" label 704 as shown in FIG. 10B. As a result, the next time a similarity search is performed within the same language domain-specific custom embedding vector space, the custom copy 1004 of the element text "reserve" is used as a basis for a similarity search as indicated by the dashed line circle 804, and the global label "Add to cart" will be returned in response to a similarity search. In the example vector attraction operation of FIGS. 10A-10B, the copied element text "reserve" 1004, which moves, may be referred to as a 'target' and the global label "Add to cart" 704, which does not move, may be referred to as an "anchor".

Figure 11A:
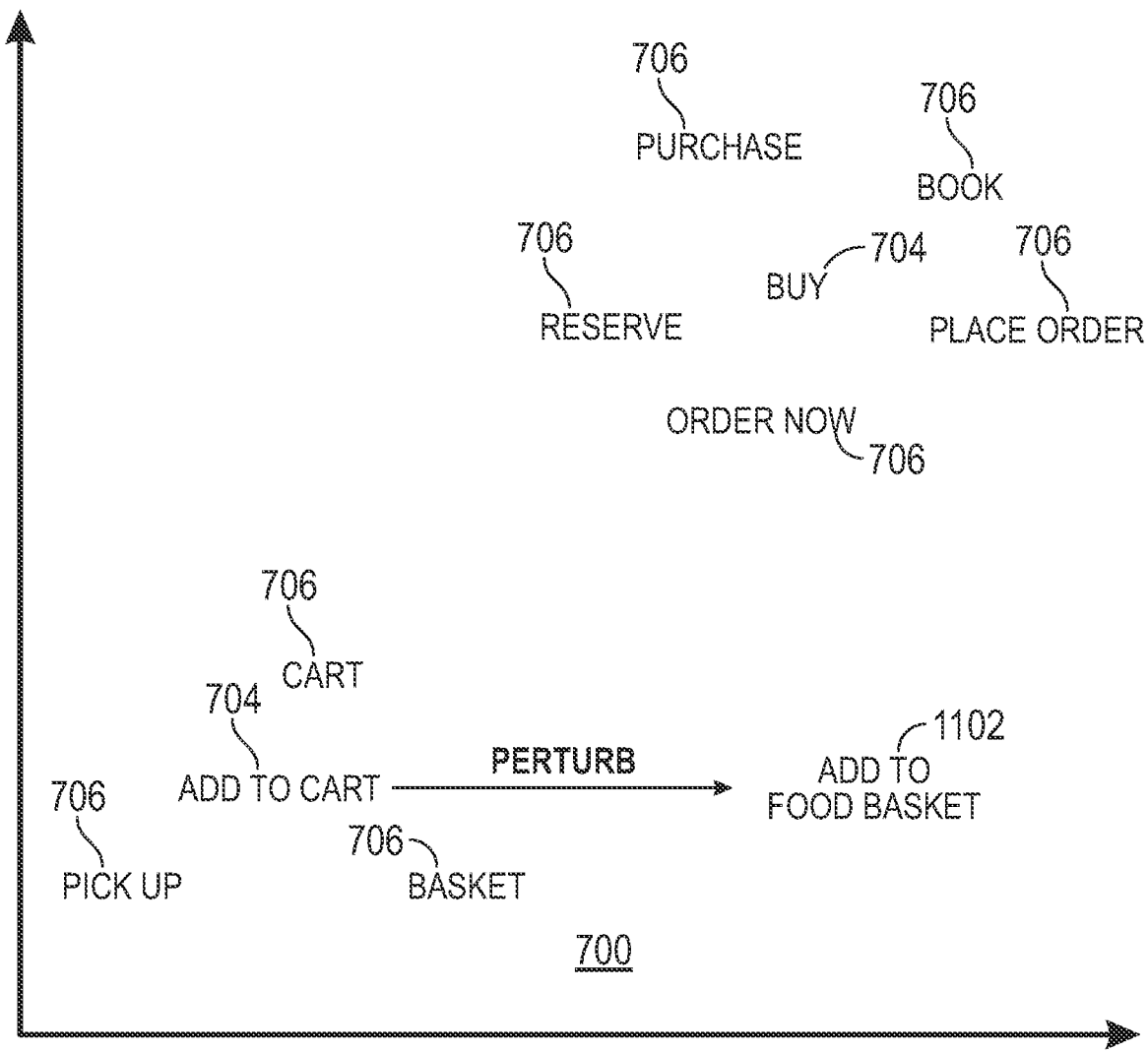
FIGS. 11A-11B are illustrative drawings representing updating of an embedding vector space based upon second branch operations of the example refinement process in which an element text is present in the embedding and a custom label is not present in the embedding and in which a predicted label is too general.
Figure 11B:
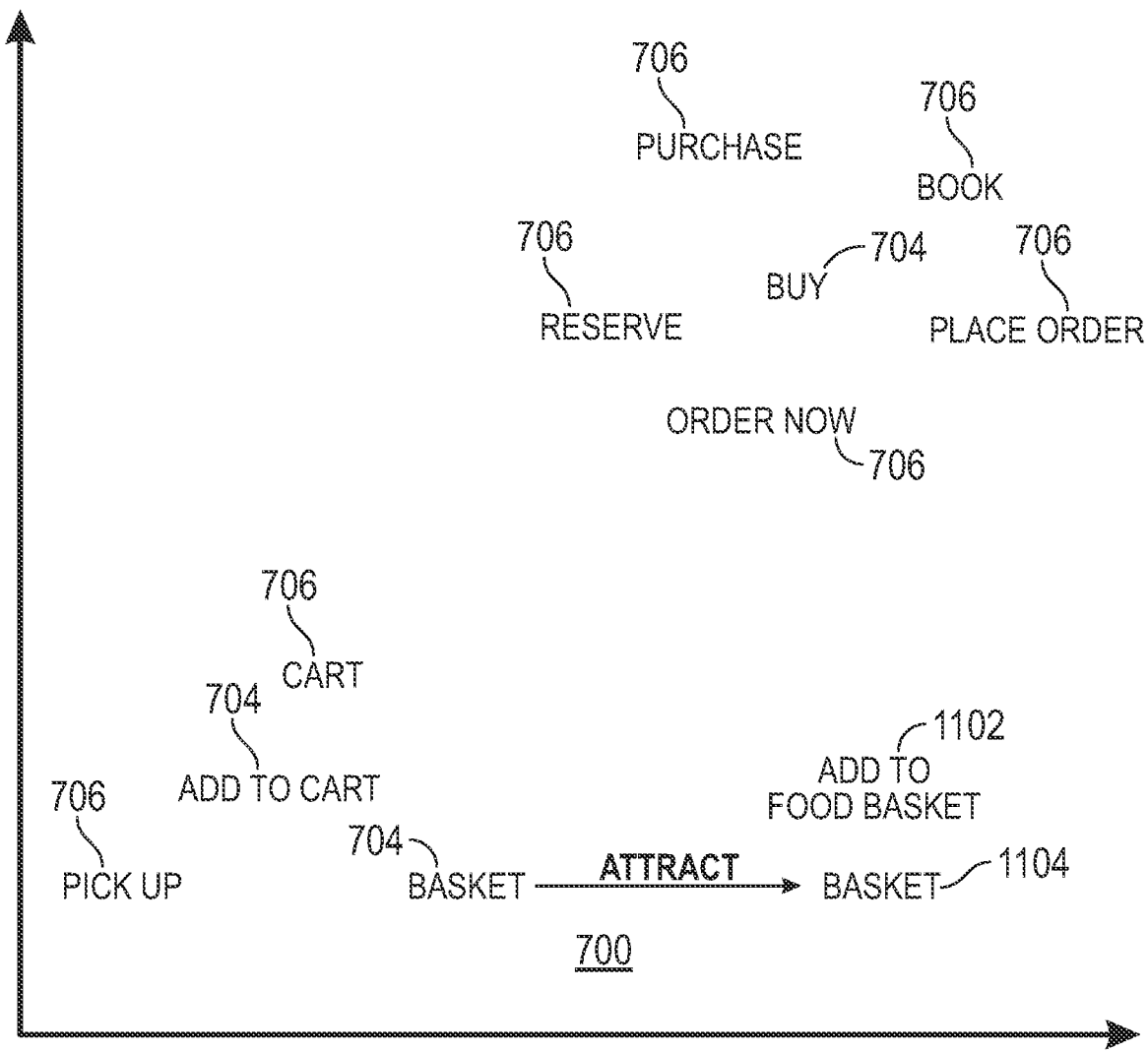

FIGS. 11A-11B are illustrative drawings representing updating of an embedding vector space based upon second branch operations of the example refinement process 800 in which an element text is present in the embedding and a custom label is not present in the embedding and in which a predicted label is too general. The example operations of FIGS. 11A-11B add the custom label to a custom embedding vector space and prioritize a nearest neighbor association between the custom label and the element text over a nearest neighbor relationship between the starting label and the element text. Referring to FIG. 8, the second branch of the refinement process 800 includes operation 804, operation 804-1, operation 808 and operation 810. Operation 808 is a decision operation that determines whether a predicted label is "too general", is "inaccurate", or "other". Control flows to operation 810 in response to a determination that the predicted label is too general. In this example, it is assumed that the predicted label is "add to cart".

In this example, control input received at the input UI 204 includes a feedback command that the predicted label "Add to cart" is "too general" and to request creation of a new custom label "Add to food basket" 1102. As shown in FIG. 11A, in response to the analyst user's feedback command, indicating that the "Add to cart" label 704 is "too general" and to create a new "Add to food basket label, the vector operations API 206 provides a request to the embedding vector database control 208 to implement the requested creation of a custom "Add to food basket" label and a new custom "Add to food basket" label 1102 is created and added to the embedding vector space 700 nearby to the predicted label "Add to cart" 704. The embedding vector database control 208 assigns a UUID to the new custom "Add to food basket" label 1102 to designate the new custom label 1102 as being a domain-specific label associated with a particular language domain-specific custom embedding vector space. Also as shown in FIG. 11A, the embedding vector database control 208 uses a perturb vector operation to move the newly created "Add to food basket" label 1102 to cause it to move to a location within the embedding that is more distant from the predicted "Add to cart" label 704. In addition, as shown in FIG. 11B, the embedding vector database control 208 creates a copy 1104 of the "basket" element text 1104 and uses the attract vector operation to move the "basket" element text copy 1104 to a location, within a language domain-specific embedding vector space, that is closer to the newly created custom "Add to food basket" label 1102 than to the predicted "Add to cart" label 704.

Figure 12A:
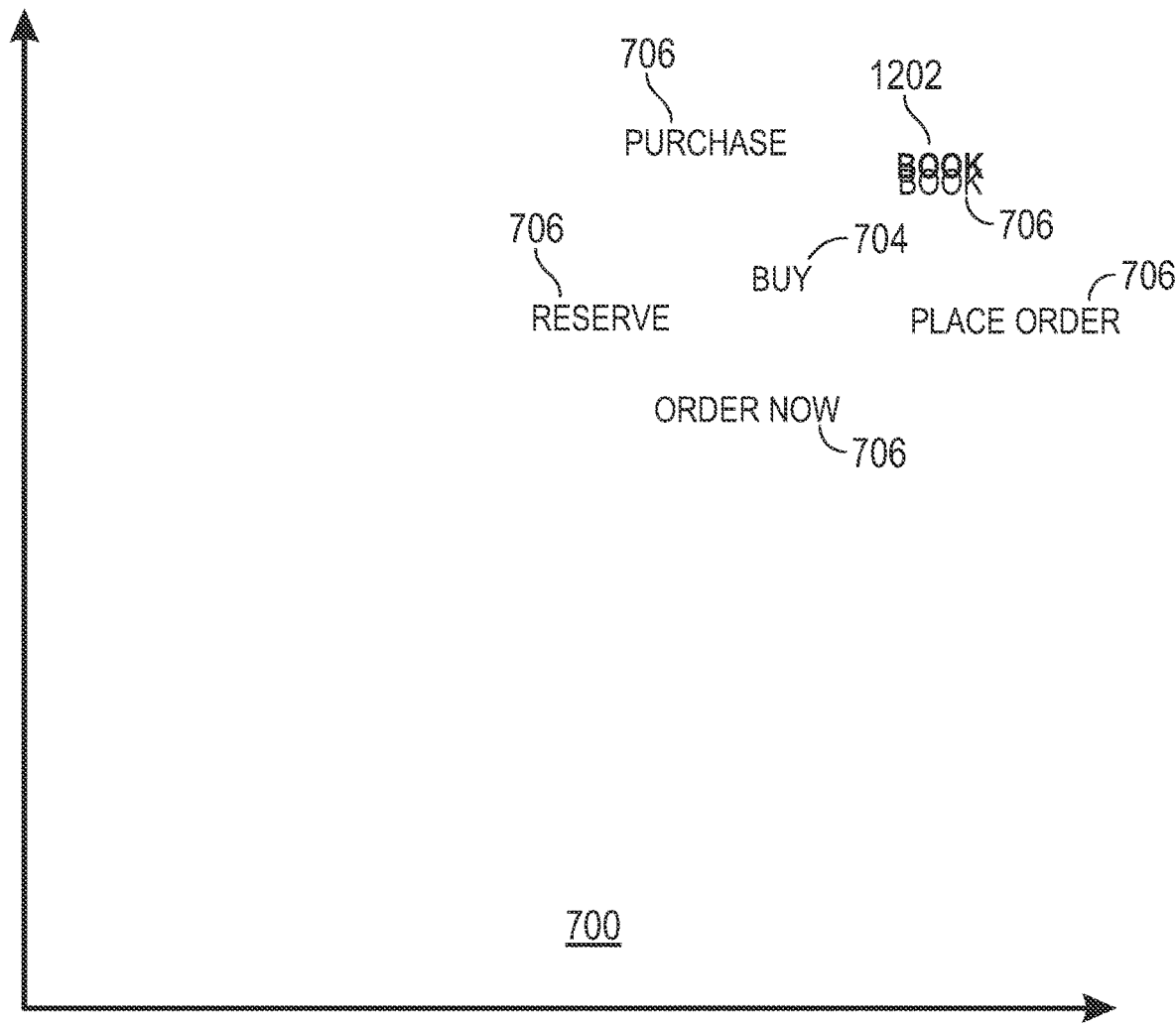
FIGS. 12A-12B are illustrative drawings representing updating of an embedding vector space based upon third branch operations of the example refinement process in which an element text is present in the embedding and a custom label is not present in the embedding and in which a predicted label is incorrect.
Figure 12B:
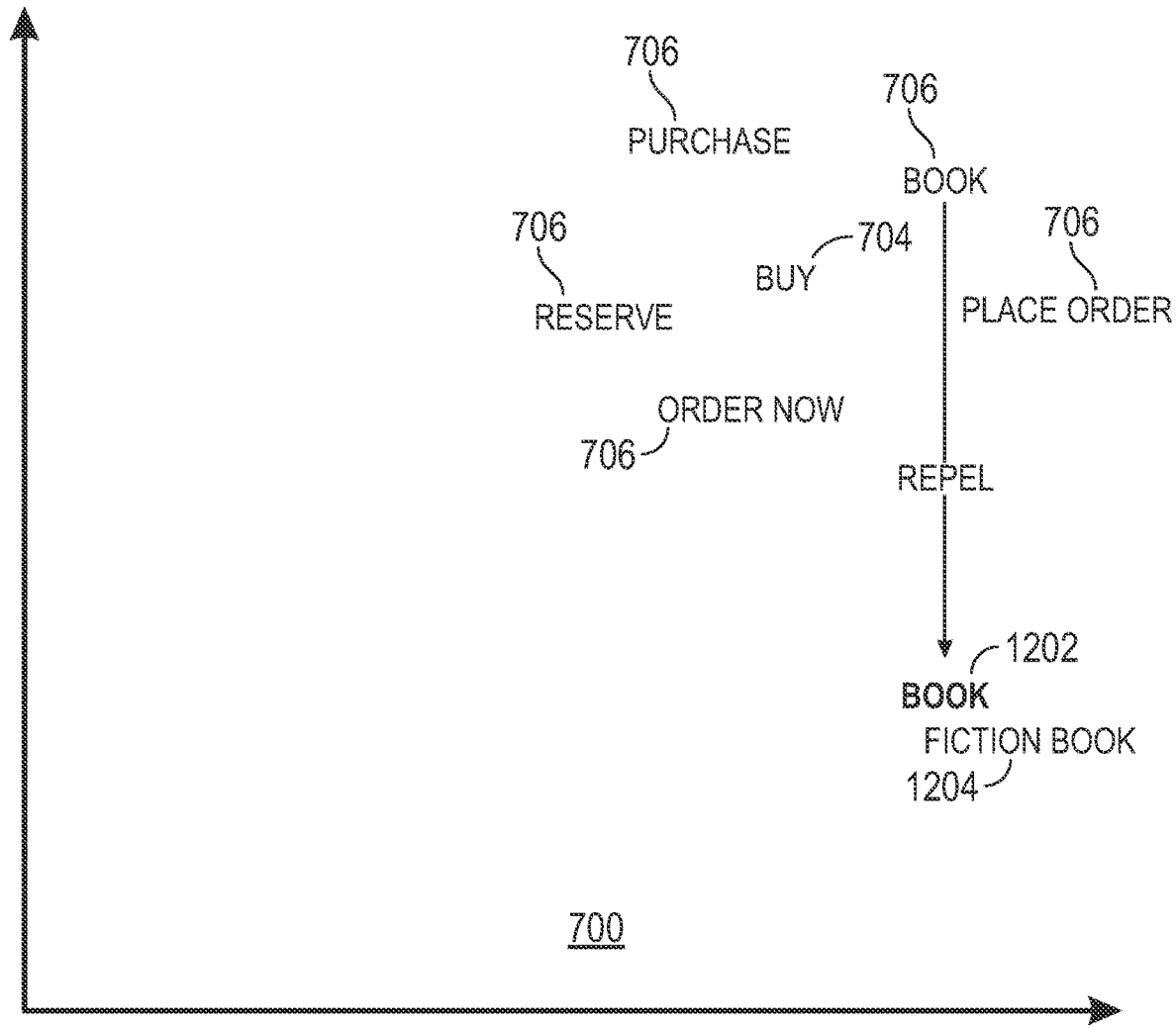

FIGS. 12A-12B are illustrative drawings representing updating of an embedding vector space based upon third branch operations of the example refinement process 800 in which an element text is present in the embedding and a custom label is not present in the embedding and in which a predicted label is incorrect. The example operations of FIGS. 12A-12B add the custom label to the second embedding vector space, associate the custom label as a nearest neighbor to the vector, and deprioritizing a nearest neighbor association between the starting label and the element text. Referring to FIG. 8, the third branch of the refinement process 800 includes operation 804, operation 804-1, operation 808 and operation 812. Following decision operation 808, control flows to operation 812 in response to a determination that the predicted label is inaccurate. In this example, the element text "book" 706 is located nearby to the "Buy" global label 704 within the embedding vector space. For example, the "book" element text 706 may be located nearby to the "Buy" global label 704 because it was assumed in the embedding that the "book" element text 706 relates to intent to buy as in to "book a flight", which is related to the "Buy" label 704. However, in an example language domain relevant to a bookstore, for example, in which participants offer physical books, the element text "book" is not closely related to purchasing or buying behavior. Thus, for a language domain specific to a bookstore, for example, a nearest neighbor search result that returns the "Buy" label 704 in response to a "book" element text 706 text is incorrect.

In this example, control input received at the input UI 204 includes a feedback command that indicates that the predicted "Buy" label 704 is an "incorrect" search result for a nearest neighbor search based upon the "book" text element 706, and that requests creation of a new custom "fiction book" label 1204 to be returned in response to a nearest neighbor search for the "book" element text 706. As shown in FIG. 12A, in response to the example feedback command at the update UI 204, the vector operations API 206 provides a request to the embedding vector database control 208 to perform a vector operation to create a "book" text element copy 1202. The original "book" text element 706 and the "book" text element copy 1202 are shown superimposed on one another. As shown in FIG. 12B, in response to the example feedback command at the update UI 204, the vector operations API 206 provides a request to the embedding vector database control 208 to perform a vector operation to repel the "book" element text copy 1202 to a location that is distant from the "Buy" label 704 within the embedding vector space. Also as shown in FIG. 12B, the vector operations API 206 provides a request to the embedding vector database control 208 to perform a vector operation to create a new "fiction book" label 1204 nearby to the "book" element text copy 1202 within the custom embedding vector space for a prescribed language domain specific to a bookstore. The embedding vector database control 208 assigns a UUID to the "book" element text copy 1202 and assigns a UUID to the new "fiction book" label 1204 to designate them as being a domain-specific label associated with a particular language domain-specific embedding vector space.

Figure 13:
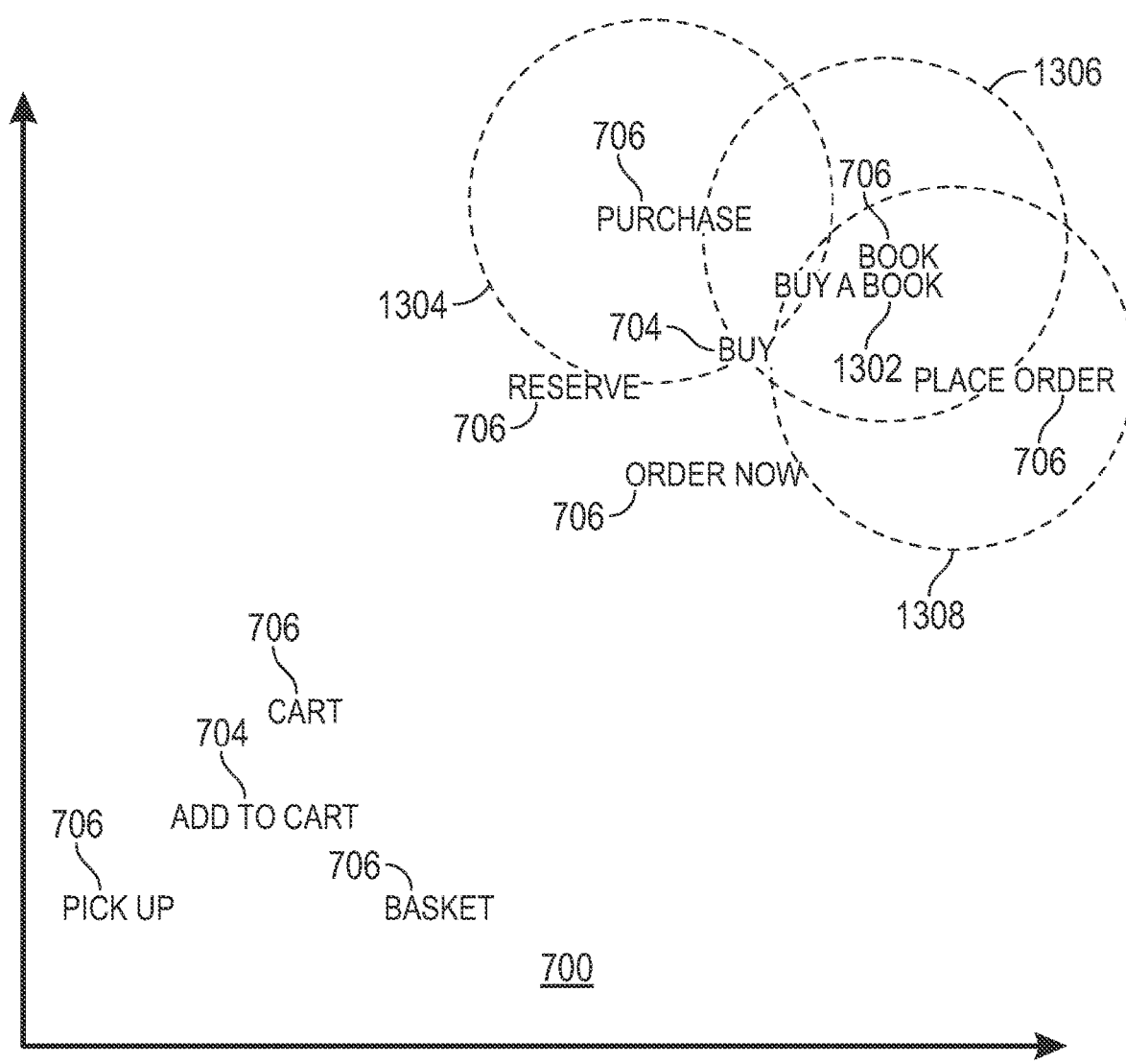
FIG. 13 is an illustrative drawing representing a problem that can arise with adding or moving a label within a vector embedding space.

FIG. 13 is an illustrative drawing representing a problem that can arise with adding or moving a label within a vector embedding space. Moving search inputs, such as element texts, adjusts nearest neighbor associations instead of moving labels because moving a label can result in the label accidentally becoming a new nearest neighbor of other search inputs. In the example embedding vector space of FIG. 13, it is assumed that "Buy" label 704 and the "Add to cart" label 704 were pre-existing within the vector embedding space and that the "buy a book" label 1302 is a newly added or moved to the location shown that is nearby to the "book" element text. Assume that the "buy a book" label is added at/moved to a location near to the "book" element text within the embedding so that the "buy a book" label 1302 will be output in response to a nearest neighbor search based upon the element text "book" 706. Dashed line circle 1304 represents a nearest neighbor relationship between the element text "purchase" and the newly added/moved "buy a book" label. Dashed line circle 1306 represents a nearest neighbor relationship between the element text "book" and the newly added/moved "buy a book" label. Dashed line circle 1308 represents a nearest neighbor relationship between the element text "place order" and the newly added/moved "buy a book" label. Thus, adding/moving the "buy a book" label 1302 nearby to the element text "book" as shown also would make "buy a book" a nearest neighbor to the element texts "purchase" and "place order". So, adding/moving the "buy a book" label 1302 would disrupt or change the nearest neighbor relationships of other inputs, which are intended to be nearest neighbors to the "Buy" label 704, not to the "buy a book" label 1302. For at least this reason, vector operations that move text elements are favored over vector operations that move labels.

Figure 14:
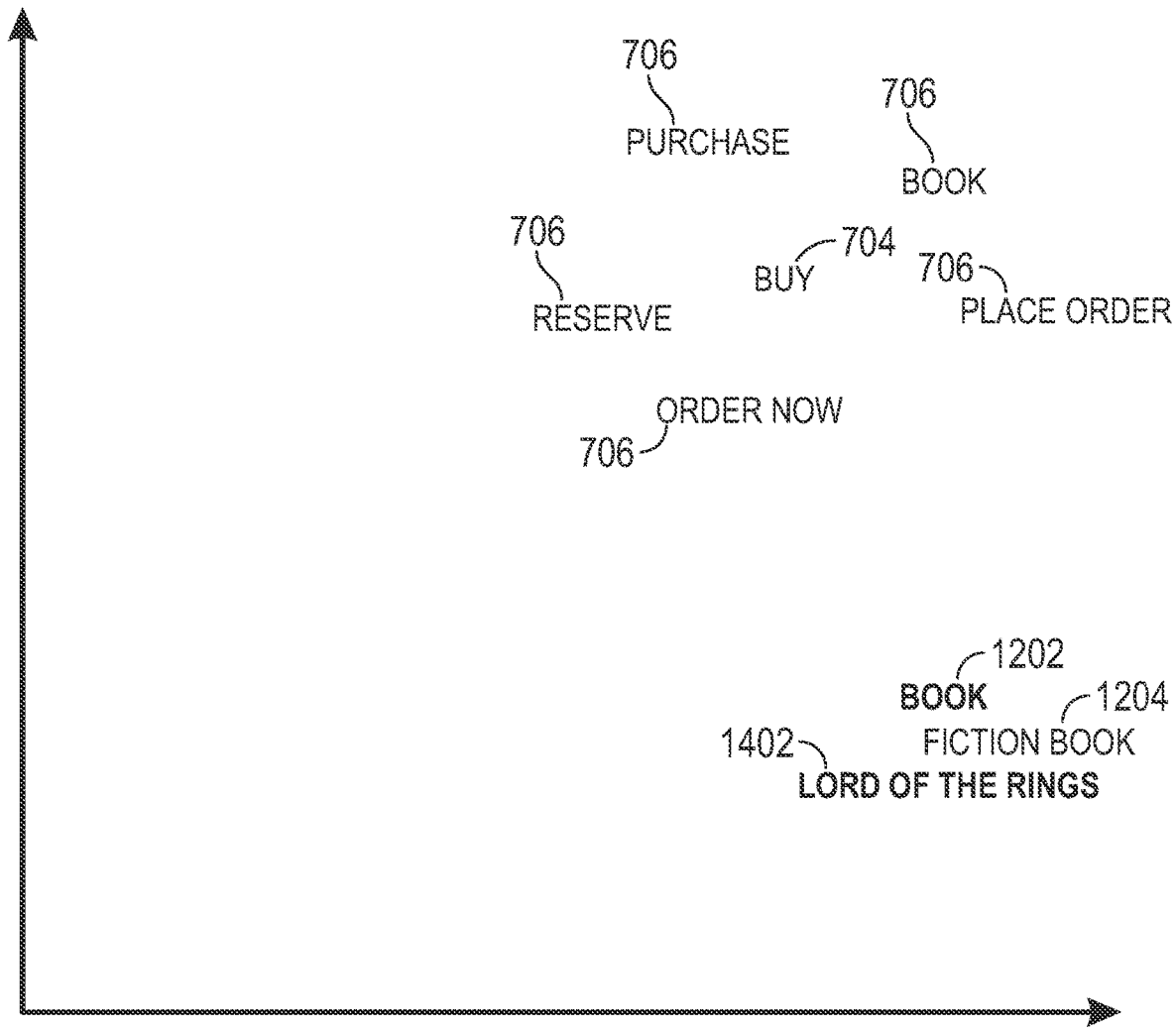
FIG. 14 is an illustrative drawing representing fourth branch operations of the example refinement process to update an embedding vector space in which an element text is not present in the embedding, a custom label is present in the embedding and a nearest neighbor search fails to predict a label.

FIG. 14 is an illustrative drawing representing fourth branch operations of the example refinement process 800 to update an embedding vector space in which an element text is not present in the embedding, a custom label is present in the embedding and a nearest neighbor search fails to predict a label. The example operations of FIG. 14 add the element text to the second embedding vector space and associate the element text and the custom label as nearest neighbors within the second embedding vector space. Referring to FIG. 8, the fourth branch of the refinement process 800 includes operation 802, operation 804-2, and operation 814. Following determination at operation 802 that element text is not within the embedding and a determination at operation 804-2 that a custom label is included in the embedding, control flows to operation 814. For example, assume that a new element text "Lord of the Rings", which is not included in the embedding vector space, is received as analyst/admin user input to be added as new element text. A control feedback command can be provided by an analyst user at the update UI 204 to locate the new "Lord of the Rings" element text 1402 in nearest neighbor proximity to a pre-existing "fiction book" label 1204, which already is present in the embedding. In response to the example feedback command at the update UI 204, the vector operations API 206 can provide a request to the embedding vector database control 208 to perform a vector operation to perturb the "fiction book" label 1204 and to use a new vector produced based upon the perturb operation to locate the new "Lord of the Rings" element text 1402 in nearest neighbor proximity to the "fiction book" label 1204 within a custom embedding vector space. It is noted that the "book" element text 1202 also is in nearest neighbor proximity to the "fiction book" label 1204 as explained above with reference to FIGS. 12A-12B.

Figure 15:
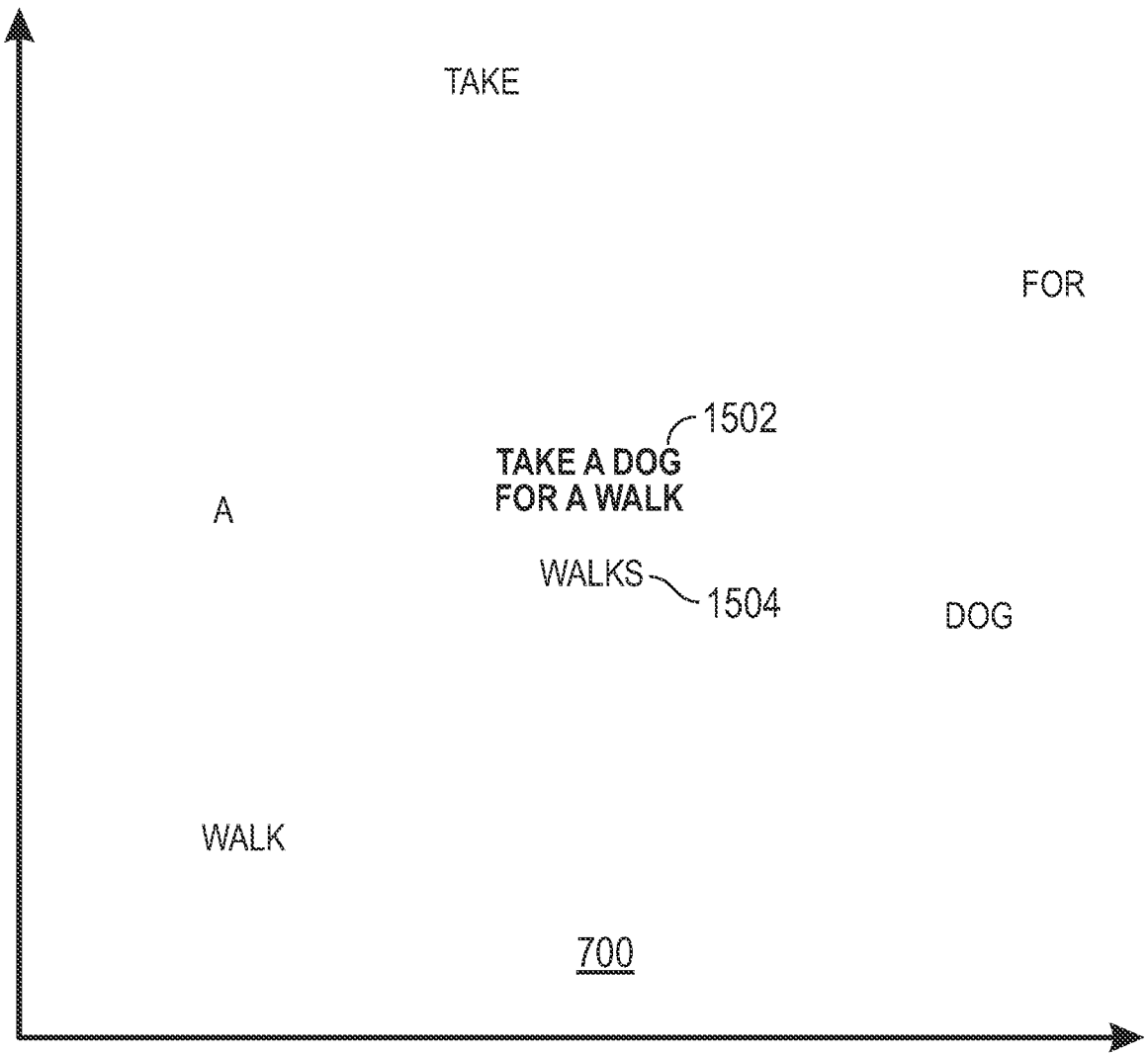
FIG. 15 is an illustrative drawing representing fifth branch operations of the refinement process to update an embedding vector space in which an element text is not present in the embedding, a custom label is not present in the embedding, and in which the new element text includes pre-population words within an embedding vector space.

FIG. 15 is an illustrative drawing representing fifth branch operations of the refinement process 800 to update an embedding vector space in which an element text is not present in the embedding, a custom label is not present in the embedding, and in which the new element text includes pre-population words within an embedding vector space. The pre-population words may be GloVe words, for example. Example operations of FIG. 15 add element text to the custom embedding vector space and associate the element text and the custom label as nearest neighbors within the custom embedding vector space. Referring to FIG. 8, the fifth branch of the refinement process 800 includes operation 802, operation 804-2, and operation 816 and operation 818. Following a determination at operation 802 that received element text is not included in the embedding, a determination at operation 804-2 that a custom label is not included in the embedding, and at operation 816 that the input element text includes pre-population words (e.g., GloVe words), control flows to operation 818. In this example, a "take a dog for a walk" element text 1502 is not included in the vector embedding space. However, the individual words within the "take a dog for a walk" element text 1502, "take", "a", "dog", "for", and "walk", are included within the embedding. A control feedback command specifying "Too general" or "Incorrect" can be provided by an analyst user at the update UI 204 if the system provided an initial label; this allows the system to adjust the initial label assignment. Otherwise, the user does not provide feedback, and the system inserts the new language. The vector operations API 206 provide a request to the embedding vector database control 208 to determine, within a custom embedding, an "average vector" that is an average of the vectors of the pre-population words within the "take a dog for a walk" element expression 1502. A determination is made as to which of the pre-populated words contained within the "take a dog for a walk" element expression 1502 is closest to the determined average vector within the embedding. In this example, it is assumed that the word "walk" 1504 is determined to be closest. A control feedback command can be provided by an analyst user at the update UI 204 to select the identified "walk" word as a new label. The vector operations API 206 can perform a vector operation to perturb the new "word" label and can use to use a new vector produced based upon the perturb operation to locate the "take a dog for a walk" element text 1502 in nearest neighbor proximity to the newly created "walk" label 1504.

Figure 16:
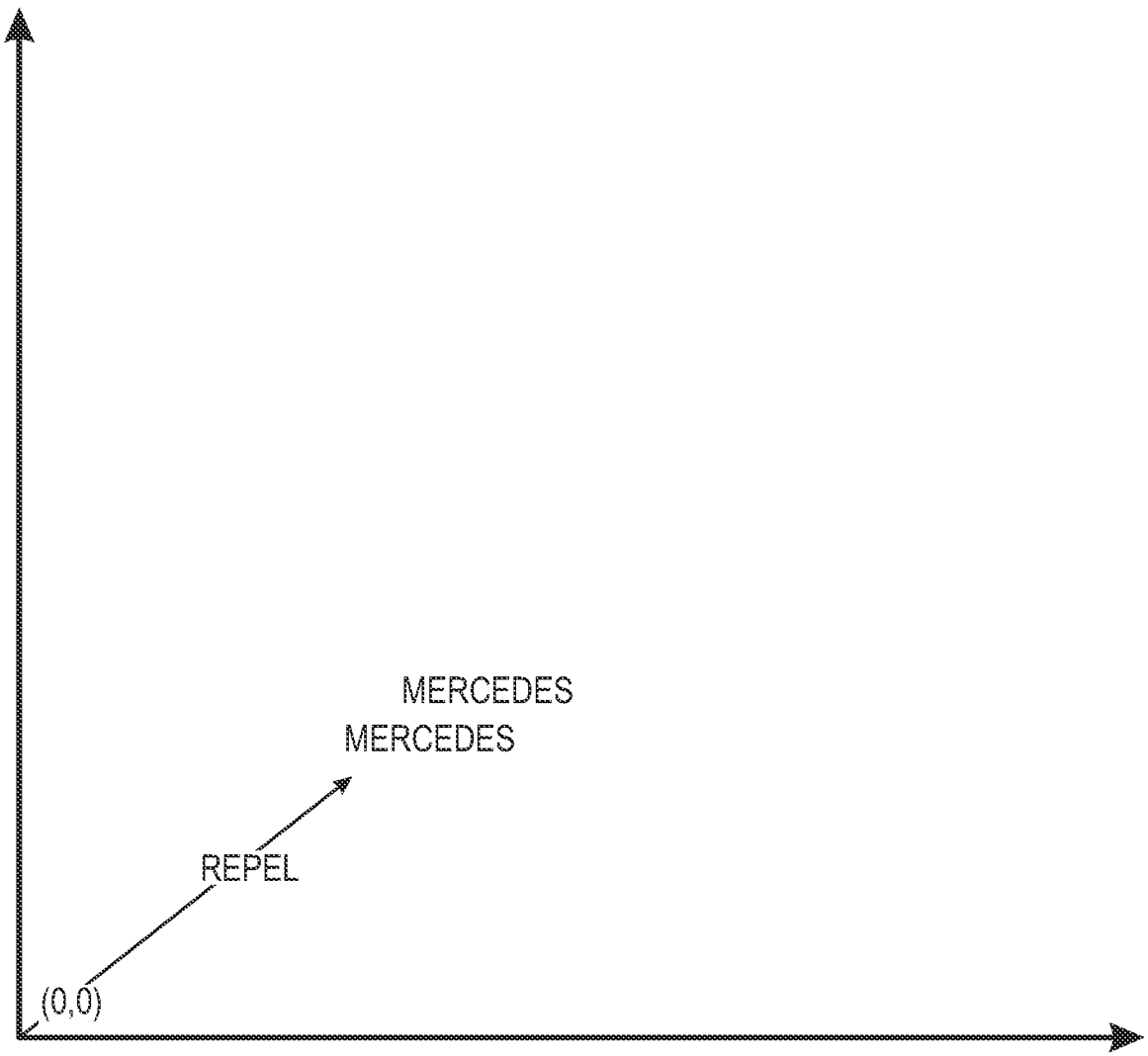
FIG. 16 is an illustrative drawing representing sixth branch operations of the refinement process to update an embedding vector space in which an element text is not present in the embedding, a custom label is not present in the embedding, and in which the new element text does not include pre-population words within an embedding vector space.

FIG. 16 is an illustrative drawing representing sixth branch operations of the refinement process 800 to update an embedding vector space in which an element text is not present in the embedding, a custom label is not present in the embedding, and in which the new element text does not include pre-population words within an embedding vector space. Referring to FIG. 8, the sixth branch of the refinement process 800 includes operation 802, operation 804-2, operation 816 and operation 820. Following a determination at operation 816 that the input element text does not include pre-population words (e.g., no GloVe words), control flows to operation 820. In this example, an analyst/admin user provides a new element text "Mercedes". Starting at an origin location of the embedding vector space (0. 0, 0, . . . 0), a repel operation in a randomly selected direction is used to generate a reference vector for a new label. A perturbation operation is used to perturb the reference vector to generate a new element text vector. A new element then can be assigned to the reference vector. The new element text 'Mercedes' is assigned to the new element text vector.

Figure 17:
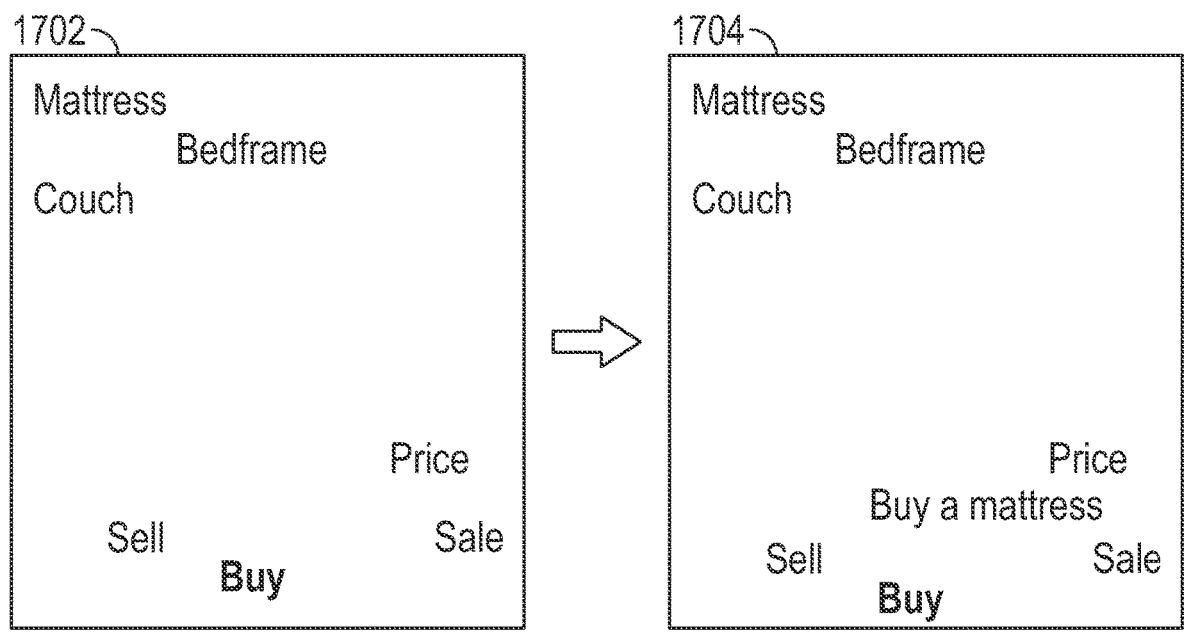
FIG. 17 is an illustrative drawing representing an example starting/global embedding vector space and an example custom embedding vector space developed based upon the starting/global embedding vector space.

FIG. 17 is an illustrative drawing representing an example starting/global embedding vector space 1702 and an example custom embedding vector space 1704 developed based upon the starting/global embedding vector space 1702, in accordance with some embodiments. The custom embedding vector space 1704 includes a copy of a portion of the starting/global vector space 1702. In this example, the word "buy" is a label, and the terms mattress, couch, bedframe, sell, price, and sale are element texts. It can be seen that in an example representing starting/global embedding ontology 1702, the element texts mattress, couch and bedframe are clustered together and that the element texts sell, price, and sale with the label "buy" are clustered together. In this example, assume that the label "buy" is displayed and that an analyst/admin user enters the label "buy a mattress" and provides an indication that the label "buy" is too general. In response, an embodiment creates the phrase "buy a mattress" in the custom embedding 1704. The vector attract operation is used to attract the newly added phrase close to the label "buy". The perturb vector function may be used to perturb a vector associated with the phrase "buy a mattress" so that the phrase "buy a mattress" is not at an identical location to the label "buy". It will be appreciated that the starting/global embedding 1702 acts as a base or starting point for development of the custom embedding 1704. Even after the custom embedding 1704 is changed relative to the starting/global embedding 1702, the custom embedding 1704 still is a copy of at least a portion of the global/starting embedding 1702. For example, both embeddings 1702, 1704 include identical element text clusters that include element texts, mattress, couch, and bedframe.

Custom Labels for an Audio Transcript

An example embodiment produces an electronic display representation of test user interaction with a digital asset as an audio recording transcript of a contemporaneous test user talk-along that includes labels. Test user interaction data can include a transcript of an audio recording of words spoken by the test user while interacting with a digital asset. FIG. 18A is an illustrative drawing of a display screen 1802 showing an audio transcript 1804 and associated with starting labels 1806 indicating inferred test user intent based upon a test user's spoken words in the transcript 1804. The example starting labels 1806 are "pain point", "confusion", "suggestion", "dislike", and "aversion". The display screen 1802 also includes a custom label: visual appeal" 1808 inputted by an analyst/admin to replace the starting label suggestion. FIG. 18B is an enlarged view of a segment of the transcript 1804 containing the starting label "suggestion" and the custom label "visual appeal". The processes described above with reference to strating labels and custom labels with reference to Sankey diagrams also apply to an audio transcript representation.

System Architecture

Figure 19:
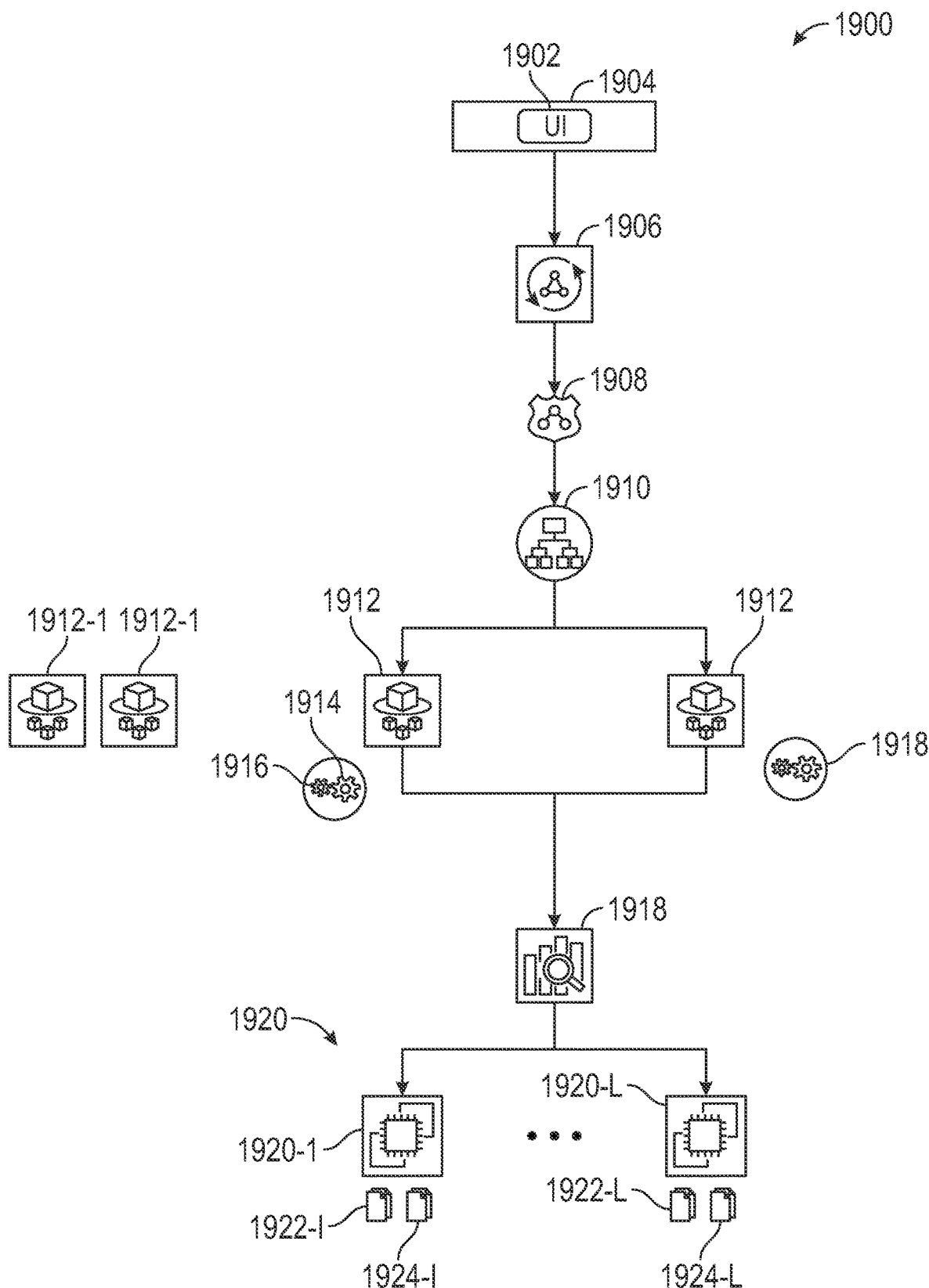
FIG. 19 is an illustrative diagram representing a system architecture of a computing machine in accordance with some embodiments.

FIG. 19 is an illustrative diagram representing a system architecture of a computing machine 1900 in accordance with some embodiments. The computing machine 1900 provides a user interface 1902 that can be displayed at a computing device 1904. The computing machine 1900 includes a vector operations interface 1906, a domain name server 1908, load balancer servers 1910, custom embedding vector services 1912, vector operations logic 1914, and one or more database control servers 1918 to provide access to a database 1920. The database 1920 includes segregated storage regions 1920-1 to 1920-L to store respective instances of a non-custom global embedding vector space 1922-1 to 1922-L and to store respective custom embedding vector spaces 1924-1 to 1924-L. The term 'global' signifies that the content of the non-custom embedding vector space is accessible to all groups.

The user interface (UI) 1902 is accessible over a network 1905 to multiple computing devices 1904 (only one shown) to allow analyst/admin users, associated with prescribed groups, to view representations of test user interactions with a digital asset and to receive requests to update custom embeddings. More particularly, the UI 1902 can be used to identify a group associated with test user digital interaction information and to receive analyst/admin user input to cause adjustment of a custom embedding associated with the identified group. The visual representations can be Sankey diagrams or audio recording transcripts, for example.

An example vector operations interface 1906 can include a graph QL endpoint (graph query language) to facilitate communication between a human analyst/admin user interacting with the UI 1902 and the embedding vector services 1912 and database control 1918.

The domain name server 1908 provides domain name services to permit computing devices 1904 to access the application load balancer servers 1910 over the network 1905. The application load balance servers 1910 are configured to balance traffic in a round-robin fashion to multiple instances of embedding vector services 1912 that run on the load balance servers 1910. The load balance servers 1910 include one or more processor circuits (not shown) configured using executable instructions stored in a one or more memory storage devices (not shown) to configure the load balance servers 1910 to implement the instances of the embedding vector services 1912. Additional instances of the embedding vector services 1912-1, 1912-1 can be created on demand to run on the servers 1910.

The embedding vector services 1912 use the servers 1910 to access the vector operations logic 1914. Example vector operations logic 1914 includes executable instructions stored in memory 1916 to produce a vector based upon data indicative of test user interaction with a digital asset and to project the vector to an instance of the global non-custom embedding vector space and to a prescribed custom embedding vector space, both of which are associated with prescribed group and both of which are stored within the database 1920 at one or more memory regions associated with the prescribed group. The vector operations logic 1914 includes executable instructions to configure one or more processors of the servers 1910 to access a prescribed custom embedding vector space within the database 1920 and to use vector operations such as create, attract, repel, and perturb to adjust the prescribed custom embedding vector.

The one or more database control servers 1918 include one or more processor circuits (not shown) configured with executable instructions stored in one or more memory storage devices (not shown) to use a k-nearest neighbor search strategy to search a prescribed instance of the non-custom global embedding vector space, 1922-1 to 1922-L, and corresponding prescribed custom embedding vector spaces, 1924-1 to 1924-L, within segregated storage memory regions 1920-1 to 1920-L.

Figure 20:
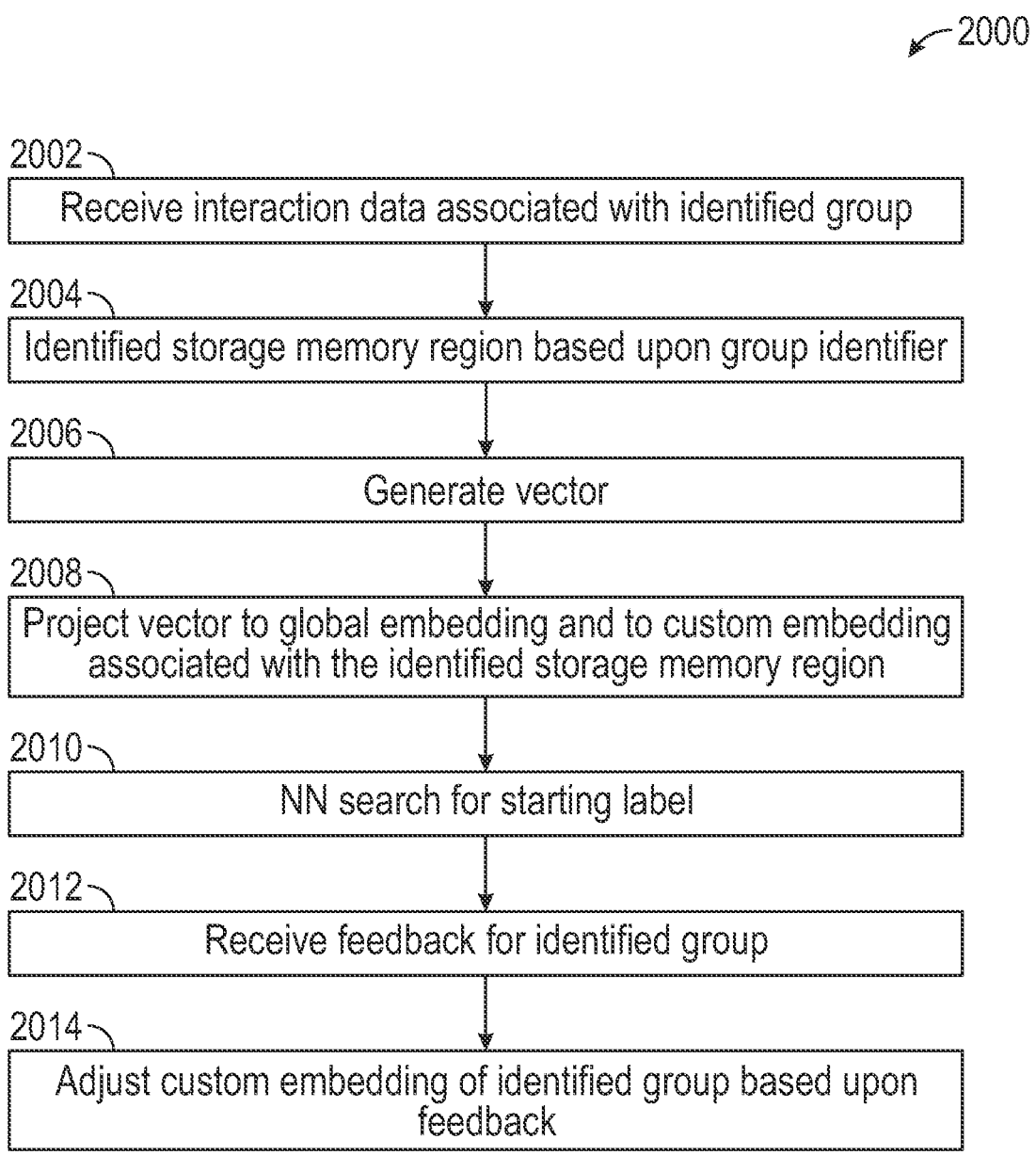
FIG. 20 is an illustrative flow diagram of an example intent label update process performed using the computing machine of FIG. 19.

FIG. 20 is an illustrative flow diagram of an example intent label update process 2000 performed using the computing machine 1900 of FIG. 19. Operation 2002 receives test user interaction data and a group identifier information for test user interaction with a digital asset associated with the identified group. Operation 2004 identifies a storage memory region associated with the identified group located with the database 2020. Operation 2006 uses an instance of the embedding vector services 1912 to produce a vector based upon the interaction data. Operation 2008 uses an instance of the embedding vector services 1912 to project the vector to an instance of a starting/global non-custom embedding and to a custom embedding stored at the identified storage memory region. Operation 2010 uses the database control 1918 to perform a nearest neighbor search within the associated starting/global embedding and within the custom embedding located within the identified storage region to determine a nearest neighbor label for the projected vector. Operation 2012 uses the vector operations interface 1906 to receive feedback for the identified group based upon the determined label. Operation 2014 uses vector operations logic 1914 to adjust the custom embedding within the identified storage region based upon the feedback.

Segregation of different custom embedding vector spaces into different storage memory regions of a database and configuring computer processing resources to make different respective custom embedding vector spaces associated with different respective groups having different respective language domains, accessible over a network via an update user interface, for vector projection into, nearest neighbor search within, and adjustment of the different respective custom embeddings based upon input provided by respective user representatives of the different respective associated groups, is an improvement to a technology.

The above description is presented to enable any person skilled in the art to create and use a system and method for custom label embedding. Various modifications to the embodiments will be readily apparent to those skilled in the art, and the generic principles defined herein may be applied to other embodiments and applications without departing from the spirit and scope of the invention. For example, in an alternative embodiment, a stored instance of a non-custom/global embedding may be shared among more than one group. That is, in an alternative embodiment, different groups may access an instance of the global embedding for vector projection and nearest neighbor searches, for example. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of examples in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A computer-based method to identify test user intent during evaluation of user interaction with a digital asset comprising:
   receiving data indicative of test user interaction with the digital asset;
   producing a vector representing the received data;
   using a trained machine learning model to project the vector to a first non-custom label embedding vector space, stored in a storage memory;
   using the trained machine learning model to project the vector to a second custom label embedding vector space, stored in the storage memory;
   determining a starting label associated with the vector based at least in part upon a nearest neighbor search within the first non-custom label embedding vector space for a label nearest to the vector and a nearest neighbor search within the second custom label embedding vector space for a label nearest to the vector;
   receiving user input associating a custom label with the starting label; and
   adjusting the second custom label embedding vector space based upon the user input.

2. The method of claim 1,
   wherein determining further includes prioritizing a starting label returned from within the second vector space over a starting label returned from the first vector space.

3. The method of claim 1 further including:
   causing displaying at a computing device, a visual representation of the received data on a display screen; and
   causing displaying at the computing device, the determined starting label on the display screen in association with the visual representation.

4. The method of claim 3,
   wherein the visual representation includes a Sankey diagram.

5. The method of claim 3,
   wherein the received data includes test user speech recorded during test user interaction with the digital asset; and
   wherein the visual representation includes a transcript of the recorded test user speech.

6. The method of claim 1,
   wherein the received data are indicative of a sequence of test user interactions with the digital asset.

7. The method of claim 1,
   wherein the received data are indicative of values for variable features of the digital asset during the test user interaction with the digital asset.

8. The method of claim 1,
   wherein the received data are indicative of a sequence of values for variable features of the digital asset during a corresponding sequence of test user interactions with the digital asset.

9. The method of claim 1 further including:
   receiving user input identifying the starting label.

10. The method of claim 1 further including:
    receiving user input providing an adjustment command;
    wherein adjusting includes adjusting the second custom label embedding vector space based upon the adjustment command.

11. The method of claim 1,
    wherein the machine learning model is trained based at least in part upon multiple non-custom labels located at vector locations within the first embedding vector space.

12. The method of claim 1,
    wherein the second custom label embedding vector space comprises a copy of at least a portion of the first embedding vector space.

13. The method of claim 1,
    wherein the machine learning model is trained based at least in part upon multiple non-custom labels located at vector locations within the first non-custom label embedding vector space;
    wherein the second custom label embedding vector space comprises a copy of at least a portion of the first non-custom label embedding vector space.

14. The method of claim 1,
    wherein the vector represents an element text; and
    wherein based at least in part upon both element text data represented by the vector and the custom label being present in the second custom label embedding vector space, adjusting includes:
    associating the custom label as a nearest neighbor to element text data represented by the vector.

15. The method of claim 10,
    wherein the vector represents an element text; and
    wherein based at least in part upon element text data represented by the vector being present in the second custom label embedding vector space and the custom label not being present in the second custom label embedding vector space and receiving the received adjustment command indicating the starting label is too general, adjusting includes:
    adding the custom label to the second custom label embedding vector space; and
    moving the element text data within the second custom label embedding vector space to cause the custom label to be a nearest neighbor to element text data represented by the vector to prioritize a nearest neighbor association between the custom label and the element text data over a nearest neighbor association between the starting label and the element text data.

16. The method of claim 10,
    wherein the vector represents an element text; and
    wherein based at least in part upon element text data represented by the vector being present in the second custom label embedding vector space and the custom label not being present in the second custom label embedding vector space and the received adjusting command indicating the starting label is incorrect, adjusting includes:
    adding the custom label to the second custom label embedding vector space; and associating the custom label as a nearest neighbor to the text data within the second custom label embedding vector space; and deprioritizing a nearest neighbor association between the starting label and the element text.

17. The method of claim 1, wherein the vector represents an element text; and wherein based at least in part upon element text data represented by the vector not being present in the second embedding and the custom label being present in the second custom label embedding vector space, adjusting includes:

adding the element text to the second custom label embedding vector space; and associating the element text and the custom label as nearest neighbors within the second custom label embedding vector space.

18. The method of claim 1, wherein the vector represents an element text; and wherein based at least in part upon element text data represented by the vector not being present in the second custom label embedding vector space and the custom label not being included in the second custom label embedding vector space and the element text including pre-population words within the second custom label embedding vector space, adjusting including:

determining a vector location for the element text based upon an average of vector locations of pre-population words included within the element text.

19. The method of claim 1, wherein the vector represents an element text; and wherein based at least in part upon element text data represented by the vector not being present in the second embedding and the custom label not being present in the second custom label embedding vector space, adjusting includes:

creating a reference label vector in the custom embedding vector space;

producing an element text vector based upon the reference vector within custom embedding vector space;

associating the element text with the element text vector; and receiving user input to associate a custom label to the reference vector.

20. The method of claim 1, wherein adjusting includes moving the vector within the second custom label embedding vector space to cause the custom label to be a nearest neighbor of the vector within the custom label embedding vector space.

21. The method of claim 1, wherein receiving user input associating a custom label with the starting label includes receiving user input associating a new custom label with the starting label.

22. A system to identify test user intent during evaluation of user interaction with a digital asset comprising:

processor circuitry; and a memory storing instructions which, when executed by the processor circuitry, cause the processing circuitry to perform operations comprising:

receiving data indicative of test user interaction with the digital asset;

producing a vector representing the received data;

using a trained machine learning model to project the vector to a first non-custom label embedding vector space, stored in a storage memory;

using the trained machine learning model to project the vector to a second custom label embedding vector space, stored in the storage memory;

determining a starting label associated with the vector based at least in part upon a nearest neighbor search within the first non-custom label embedding vector space for a label nearest to the vector and a nearest neighbor search within the second custom label embedding vector space for a label nearest to the vector;

receiving user input associating a custom label with the starting label; and adjusting the second custom label embedding vector space based upon the user input.

23. The system of claim 22, wherein determining further includes prioritizing a starting label returned from within the second vector space over a starting label returned from the first vector space.

24. The system of claim 22 further including:

causing displaying at a computing device, a visual representation of the received data on a display screen; and causing displaying at the computing device, the determined starting label on the display screen in association with the visual representation.

25. The system of claim 24, wherein the visual representation includes a Sankey diagram.

26. The system of claim 24, wherein the received data includes test user speech recorded during test user interaction with the digital asset; and wherein the visual representation includes a transcript of the recorded test user speech.

27. The system of claim 1, wherein the received data are indicative of a sequence of test user interactions with the digital asset.

28. The system of claim 22, wherein the received data are indicative of values for variable features of the digital asset during the test user interaction with the digital asset.

29. The system of claim 22, wherein the received data are indicative of a sequence of values for variable features of the digital asset during a corresponding sequence of test user interactions with the digital asset.

30. The system of claim 22 further including:

receiving user input identifying the starting label.

31. The system of claim 22 further including:

receiving user input providing an adjustment command;

wherein adjusting includes adjusting the second custom label embedding vector space based upon the adjustment command.

32. The system of claim 22, wherein the machine learning model is trained based at least in part upon multiple non-custom labels located at vector locations within the first non-custom label embedding vector space.

33. The system of claim 22, wherein the second custom label embedding vector space comprises a copy of at least a portion of the first non-custom label embedding vector space.

34. The system of claim 22, wherein the machine learning model is trained based at least in part upon multiple non-custom labels located at vector locations within the first non-custom label embedding vector space;

wherein the second custom label embedding vector space comprises a copy of at least a portion of the first non-custom label embedding vector space.

35. The system of claim 22,
wherein the vector represents an element text; and
wherein based at least in part upon both element text data represented by the vector and the custom label being present in the second custom label embedding vector space, adjusting includes:
associating the custom label as a nearest neighbor to element text data represented by the vector.

36. The system of claim 31,
wherein the vector represents an element text; and
wherein based at least in part upon element text data represented by the vector being present in the second custom label embedding vector space and the custom label not being present in the second custom label embedding vector space and receiving the received adjustment command indicating the starting label is too general, adjusting includes:
adding the custom label to the second custom label embedding vector space; and
moving the element text data within the second custom label embedding vector space to cause the custom label to be a nearest neighbor to element text data represented by the vector to prioritize a nearest neighbor association between the custom label and the element text data over a nearest neighbor association between the starting label and the element text data.

37. The system of claim 31,
wherein the vector represents an element text; and
wherein based at least in part upon element text data represented by the vector being present in the second custom label embedding vector space and the custom label not being present in the second custom label embedding vector space and the received adjustment command indicating the starting label is incorrect, adjusting includes:
adding the custom label to the second custom label embedding vector space; and
associating the custom label as a nearest neighbor to the text data within the second custom label embedding vector space; and
deprioritizing a nearest neighbor association between the starting label and the element text.

38. The system of claim 22,
wherein the vector represents an element text; and
wherein based at least in part upon element text data represented by the vector not being present in the second embedding and the custom label being present in the second custom label embedding vector space, adjusting includes:
adding the element text to the second custom label embedding vector space; and
associating the element text and the custom label as nearest neighbors within the second custom label embedding vector space.

39. The system of claim 22,
wherein the vector represents an element text; and
wherein based at least in part upon element text data represented by the vector not being present in the second custom label embedding vector space and the custom label not being included in the second custom label embedding vector space and the element text including pre-population words within the second custom label embedding vector space, adjusting including:
determining a vector location for the element text based upon an average of vector locations of pre-population words included within the element text.

40. The system of claim 22,
wherein the vector represents an element text; and
wherein based at least in part upon element text data represented by the vector not being present in the second embedding and the custom label not being present in the second custom label embedding vector space, adjusting includes:
creating a reference label vector in the custom embedding vector space;
producing an element text vector based upon the reference vector within custom embedding vector space;
associating the element text with the element text vector; and
receiving user input to associate a custom label to the reference vector.

41. A digital experience analysis system comprising:
a storage memory database including a plurality of different respective storage memory regions corresponding to a plurality of different respective groups, wherein different respective storage memory regions associated with a different respective groups, store different respective copies of a global embedding vector space and store different respective custom embedding vector spaces;
processor circuitry; and
a memory storing instructions which, when executed by the processor circuitry, cause the processor circuitry to perform operations comprising:
receiving data identifying a group from among the different respective groups, wherein the data is indicative of test user interaction with a digital asset;
producing a vector representing the received data;
using a trained machine learning model to project the vector to an instance of a global label embedding vector space at a storage region associated with the identified group;
using the trained machine learning model to project the vector to a custom label embedding vector space at a storage region associated with the identified group;
determining a starting label associated with the vector based at least in part upon a nearest neighbor search within the instance of the global embedding vector space associated with the identified group for a label nearest to the vector and a nearest neighbor search within the custom embedding vector space associated with the identified group for a label nearest to the vector;
receiving user input associating a custom label with the determined starting label; and
adjusting the custom embedding vector space associated with the identified group based upon the received user input.

42. The system of claim 41,
wherein the machine learning model is trained based at least in part upon multiple non-custom labels located at vector locations within the global embedding vector space.

43. The system of claim 41,
wherein determining further includes prioritizing a starting label returned from within the custom vector space associated with the identified group over a starting label returned from the instance of the global vector space associated with the identified group.

44. The system of claim 41 further including:
wherein adjusting includes adjusting the custom embedding vector space to associate the custom label as a nearest neighbor with the vector.

45. The system of claim 41 further including:
receiving user input providing an adjustment command;
wherein adjusting includes adjusting the custom label embedding vector space based upon the adjustment command.

46. The system of claim 41,
wherein the vector represents an element text; and
wherein based at least in part upon both element text data represented by the vector and the custom label being present in the custom embedding vector space associated with the identified group, adjusting includes:
associating the custom label as a nearest neighbor to element text data represented by the vector within the custom embedding vector space associated with the identified group.

47. The system of claim 45,
wherein the vector represents an element text; and
wherein based at least in part upon element text data represented by the vector being present in the custom embedding vector space associated with the identified group and the custom label not being present in the custom embedding vector space associated with the identified group and receiving the received adjustment command indicating the starting label is too general, adjusting includes:
adding the custom label to the custom embedding vector space associated with the identified group; and
moving the element text data within the custom label embedding vector space to cause the custom label to be a nearest neighbor to element text data represented by the vector to prioritize a nearest neighbor association between the custom label and the element text data within the custom embedding vector space associated with the identified group over a nearest neighbor association between the starting label and the element text data within the custom embedding vector space associated with the identified group.

48. The system of claim 45,
wherein the vector represents an element text; and
wherein based at least in part upon element text data represented by the vector being present in the custom embedding vector space associated with the identified group and the custom label not being present in the custom embedding vector space associated with the identified group and the received adjusting command indicating the starting label is incorrect, adjusting includes:
adding the custom label to the custom embedding vector space associated with the identified group;
associating the custom label as a nearest neighbor to the text data within the custom label embedding vector space within the custom embedding vector space associated with the identified group; and
deprioritizing a nearest neighbor association between the starting label and the element text within the custom embedding vector space associated with the identified group.

49. The system of claim 41,
wherein the vector represents an element text; and
wherein based at least in part upon element text data represented by the vector not being present in the custom embedding associated with the identified group and the custom label being present in the custom embedding vector space associated with the identified group, adjusting includes:
adding the element text to the custom embedding vector space associated with the identified group; and
associating the element text and the custom label as nearest neighbors within the custom embedding vector space associated with the identified group.

50. The system of claim 41,
wherein the vector represents an element text; and
wherein based at least in part upon element text data represented by the vector not being present in the custom embedding vector space associated with the identified group and the custom label not being included in the custom embedding vector space associated with the identified group and the element text including pre-population words within the custom label embedding vector space, adjusting including:
determining a vector location for the element text within the custom embedding vector space associated with the identified group, based upon an average of vector locations of pre-population words included within the element text.

51. The system of claim 41,
wherein the vector represents an element text; and
wherein based at least in part upon element text data represented by the vector not being present in the global embedding vector space and the custom label not being present in the second custom label embedding vector space, adjusting includes:
creating a reference label vector in the custom embedding vector space;
producing an element text vector based upon the reference vector within custom embedding vector space;
associating the element text with the element text vector; and
receiving user input to associate a custom label to the reference vector.

52. The digital experience analysis system of claim 41,
wherein adjusting includes moving the vector within the custom label embedding vector space to cause the custom label to be a nearest neighbor of the vector within the custom label embedding vector space.

53. The digital experience analysis system of claim 41,
wherein receiving user input associating a custom label with the starting label includes receiving user input associating a new custom label with the starting label.

54. A digital experience analysis system comprising:
a storage memory database that stores one or more instances of a global label embedding vector space and that includes a plurality of different respective storage memory regions corresponding to a plurality of different respective groups, wherein different respective storage memory regions store different respective custom embedding vector spaces associated with a different respective groups;
processor circuitry; and
a memory storing instructions which, when executed by the processor circuitry, cause the processor circuitry to perform operations comprising:
receiving data identifying a group from among the different respective groups, wherein the data is indicative of test user interaction with a digital asset;

producing a vector representing the received data;
using a trained machine learning model to project the vector to an instance of the one or more instances of the global label embedding vector space stored within the database;
using the trained machine learning model to project the vector to a custom label embedding vector space at a storage region associated with the identified group;
determining a starting label associated with the vector based at least in part upon a nearest neighbor search within the instance of the one or more instances of the global label embedding vector space for a label nearest to the vector and a nearest neighbor search within the custom embedding vector space associated with the identified group for a label nearest to the vector;
receiving user input associating a custom label with the determined starting label; and
adjusting the custom embedding vector space associated with the identified group based upon the received user input.

55. The digital experience analysis system of claim 54, wherein adjusting includes moving the vector within the custom label embedding vector space to cause the custom label to be a nearest neighbor of the vector within the custom label embedding vector space.

56. The system to identify test user intent of claim 22, wherein adjusting includes moving the vector within the custom label embedding vector space to cause the custom label to be a nearest neighbor of the vector within the custom label embedding vector space.

57. The digital experience analysis system of claim 54, wherein receiving user input associating a custom label with the starting label includes receiving user input associating a new custom label with the starting label.

58. A computer-implemented method of digital experience analysis comprising:
storing one or more instances of a global label embedding vector space in a storage memory;
storing multiple different respective custom embedding vector spaces at different respective storage memory regions within the storage memory, the different respective custom embedding spaces associated with different respective groups having different respective language domains;
receiving data identifying a group from among the different respective groups, wherein the data is indicative of test user interaction with a digital asset;
producing a vector representing the received data;
using a trained machine learning model to project the vector to an instance of the one or more instances of the global label embedding vector space stored within the database;
using the trained machine learning model to project the vector to a custom label embedding vector space at a storage region associated with the identified group;
determining a starting label associated with the vector based at least in part upon a nearest neighbor search within the instance of the one or more instances of the global label embedding vector space for a label nearest to the vector and a nearest neighbor search within the custom embedding vector space associated with the identified group for a label nearest to the vector;
receiving user input associating a custom label with the determined starting label; and
adjusting the custom embedding vector space associated with the identified group based upon the received user input.

59. The method of claim 58, wherein storing the one or more instances of the global embedding vector space in the storage memory includes storing a different respective instance of the global embedding vector space within the storage memory for each different respective group.

60. The computer-implemented method of digital experience analysis of claim 58, wherein adjusting includes moving the vector within the custom label embedding vector space to cause the custom label to be a nearest neighbor of the vector within the custom label embedding vector space.

61. The computer-implemented method of digital experience analysis of claim 58, wherein receiving user input associating a custom label with the starting label includes receiving user input associating a new custom label with the starting label.

* * * * *

UNITED STATES PATENT AND TRADEMARK OFFICE
CERTIFICATE OF CORRECTION

PATENT NO. : 12,242,515 B2  
APPLICATION NO. : 18/300032  
DATED : March 4, 2025  
INVENTOR(S) : Ranjitha Kumar et al.

It is certified that error appears in the above-identified patent and that said Letters Patent is hereby corrected as shown below:

On the Title Page

Item (72) Inventors: Line 2, please delete "IVancic" and please insert --Ivancic-- before "Kristijan"

In the Claims

Claim 51, Column 34, Line 29, please delete "second"

Signed and Sealed this  
Twentieth Day of May, 2025

Coke Morgan Stewart  
*Acting Director of the United States Patent and Trademark Office*